(12) United States Patent
Hurlock

(10) Patent No.: US 6,265,477 B1
(45) Date of Patent: Jul. 24, 2001

(54) AQUEOUS DISPERSION OF A PARTICULATE HIGH MOLECULAR WEIGHT ANIONIC OR NONIONIC POLYMER

(75) Inventor: John R. Hurlock, Hickory Hills, IL (US)

(73) Assignee: Nalco Chemical Company, Naperville, IL (US)

( * ) Notice: Subject to any disclaimer, the term of this patent is extended or adjusted under 35 U.S.C. 154(b) by 0 days.

(21) Appl. No.: 09/392,673

(22) Filed: Sep. 8, 1999

(51) Int. Cl.⁷ ............... C08F 2/20; C08F 2/26; C08F 120/56; C08F 220/56
(52) U.S. Cl. .......... 524/458; 524/401; 524/555; 524/826; 524/831; 526/201; 526/303.1; 526/307.6
(58) Field of Search ............... 524/831, 401, 524/458, 460, 555, 827; 525/296, 301; 526/201, 307.6, 303.1

(56) References Cited

U.S. PATENT DOCUMENTS 3,898,037 * 8/1975 Lange et al. ............ 21/2.7 R
5,605,970   2/1997 Selvarajan .
5,837,776 * 11/1998 Selverjan et al. ............ 525/244
5,985,992 * 11/1999 Chen ............ 524/814

FOREIGN PATENT DOCUMENTS 0 183 466 A2   6/1986 (EP) .
183466 * 6/1986 (EP) ............ C08F/2/10

* cited by examiner

Primary Examiner—David W. Wu
Assistant Examiner—K. C. Egwim
(74) Attorney, Agent, or Firm—Michael B. Martin; Thomas M. Breininger

(57) ABSTRACT

An aqueous dispersion of a particulate high molecular weight water soluble anionic or nonionic polymer is prepared by polymerizing 0–7 mole percent of at least one anionic monomer and 100–93 mole percent of at least one non-ionic monomer under free radical forming conditions in an aqueous solution of a water-soluble salt at a pH greater than 5 in the presence of an anionic water soluble stabilizer polymer containing from about 1.25 to about 20 mole percent 2-acrylamido-2-methyl-l-propanesulfonic acid.

12 Claims, No Drawings

US 6,265,477 B1

AQUEOUS DISPERSION OF A PARTICULATE HIGH MOLECULAR WEIGHT ANIONIC OR NONIONIC POLYMER

TECHNICAL FIELD

This invention relates to a high molecular weight anionic and nonionic dispersion polymers and to a process for their preparation.

BACKGROUND OF THE INVENTION

One of the problems that has confronted industry in the use of water soluble polymer flocculants is how to dissolve the polymer into water so that it can be utilized for its intended purpose. Early water soluble polymers were provided as dilute aqueous solutions. As the technology improved, and the molecular weights of the polymers were improved, it becomes increasingly difficult for manufacturers to ship these polymers in solution form because of the high viscosity of even one-half to one percent solutions of the polymers. Manufacturers accordingly started shipping the polymers in the form of commutated solids which could be dissolved into water using various mechanical means. While solving shipment problems, some mechanical means degraded the polymers through shear, and, incomplete dissolution of water soluble polymers, the formation of swollen translucent particles, was common. This led to a waste of polymer, and in some cases, detrimental results such as in the case of so called "fish-eye" particles which caused defects in the manufacture of paper. In the early 1970's water-in-oil emulsions of water soluble polymers were introduced. Using the water-in-oil technology, high molecular weight polymers that rapidly dissolved could be produced, and this technology achieved great acceptance in the water soluble polymer industry. A disadvantage of the water-in-oil emulsion polymer technology however is that the emulsions contain substantial quantities of hydrocarbon liquid. The introduction of hydrocarbon liquids into the systems where these water soluble polymers are used is not always beneficial.

U.S. Pat. No. 4,929,655 and U.S. Pat. No. 5,006,590 issued to Kyoritsu Yuki Co. Ltd. describe and claim a method for the production of dispersions of water soluble cationic polymers. These polymers were manufactured in an aqueous salt or brine solution in which the polymer was insoluble. The disclosure of these two patents is hereinafter incorporated by reference into this specification. The process yielded dispersions of high molecular weight polymers which when added to water would completely dissolve over a relatively short period of time. While an advance to the art, the invention was practical only for dispersions of cationically charged water soluble polymers containing at least a portion of a hydrophobically modified cationic monomer. Anionically charged water soluble polymers, those typically useful as flocculants and as drainage and retention aids in the manufacture of paper, although disclosed, could not be successfully made utilizing the Kyoritsu Yuki method which relies upon the inclusion of a cationic monomers having hydrophobic quaternary ammonium groups. Anionic polymers of course can not be prepared which include such functionality without detracting from the performance of the resultant polymer which is based on the anionic character of the polymer.

U.S. Pat. No. 5,605,970 discloses a method for the manufacture of a particular anionic water soluble polymer in dispersion form. This disclosure teaches that certain anionic polymers, incorporating hydrophobically modified monomers, can be prepared using dispersion polymer methods. The application specifically teaches the manufacture of acrylic acid-ethylhexylacrylate polymers. The ethylhexylacrylate monomer adds a hydrophobic character to the polymer, causing the polymer to become insoluble in certain brine solutions. While these polymers, and the methods for their manufacture are useful, the incorporation of a hydrophobic monomer into a water soluble polymer, where water solubility is desirable is not always advantageous in the final use of the polymer. Moreover, the useful stabilizer disclosed therein is described as having low levels of some hydrophobic monomer along with NaAMPS and or NaAc.

A process for the production of a water-soluble polymer dispersion in the presence of a dispersant, wherein the dispersant may be a poly(2-acrylamido-2-methyl propane sulfonic acid (AMPS)) or a copolymer having 30 or more mole percent of AMPS is disclosed in EP 0 183 466.

U.S. Pat. No. 5,837,776 discloses a composition and a method of making a dispersion in the presence of a stabilizer copolymer, wherein the stabilizer copolymer contains at least 20 mole percent acrylamidomethyl propane sulfonic acid. The dispersion polymers prepared as described in this patent are prepared at a pH of from 2 to 5. However, a need still exists for stable, high molecular weight dispersion polymers which do not incorporate hydrophobic monomers and which can be prepared over a wide pH range.

SUMMARY OF THE INVENTION

The polymer of this invention is a high molecular weight, nonionic or anionic water soluble vinyl addition polymer in aqueous dispersion form. The polymer is prepared over a wide pH range and without the inclusion of any monomers having hydrophobic character. The polymers are useful as flocculants and especially as retention and drainage aids in the manufacture of paper.

Accordingly, in its principle aspect, this invention is directed to a high molecular weight water-soluble dispersion polymer having a bulk Brookfield viscosity of from about 10 to about 25,000 cps at 25° C. comprising from about 5 to about 50 weight percent of a water soluble polymer prepared by polymerizing under free radical forming conditions in an aqueous solution of a water-soluble salt in the presence of a stabilizer at a pH greater than 5:

i. 0–30 mole percent of at least one anionic monomer, and,
ii. 100–70 mole percent of at least one non-ionic vinyl monomer; wherein the stabilizer is an anionic water soluble polymer having an intrinsic viscosity in 1M $NaNO_3$ of from about 0.1–10 and comprises from about 0.1 to about 5 weight percent based on the total weight of the dispersion, and the water soluble salt is selected from the group consisting of ammonium, alkali metal and alkaline earth metal halides, sulfates, and phosphates and comprises from about 5 to about 40 weight percent based on the weight of the dispersion.

In another aspect, this invention is directed to a method of preparing a high molecular weight dispersion polymer having a bulk Brookfield viscosity of from about 10 to about 25,000 cps at 25° C. comprising a) adding a free-radical initiator to an aqueous mixture comprising:
   i. from about 5 to about 50 weight percent of a mixture comprising 0–30 mole percent of at least one anionic monomer and 100–70 mole percent of at least one non-ionic vinyl monomer;
   ii. from about 0.1 to about 5 weight percent based on the total weight of the dispersion of a stabilizer, wherein the stabilizer is an anionic water soluble polymer having an intrinsic viscosity in 1M NaNO₃ of from about 0.1–10 and iii. from about 5 to about 40 weight percent based on the weight of the dispersion of a water soluble salt selected from the group consisting of ammonium, alkali metal and alkaline earth metal halides, sulfates, and phosphates; and b) polymerizing the monomers.

DETAILED DESCRIPTION OF THE INVENTION

"Monomer" means a polymerizable allylic, vinylic or acrylic compound.

"Anionic monomer" means a monomer as defined herein which possesses a net negative charge. Representative anionic monomers include acrylic acid, methacrylic acid, 2-acrylamido-2-methyl-1-propanesulfonic acid, acrylamidomethylbutanoic acid, maleic acid, fumaric acid, itaconic acid, vinyl sulfonic acid, styrene sulfonic acid, vinyl phosphonic acid, allyl sulfonic acid, allyl phosphonic acid, sulfomethylated acrylamide, phosphonomethylated acrylamide and the water soluble alkali metal, alkaline earth metal, and ammonium salts thereof. The choice of anionic monomer is based upon several factors including the ability of the monomer to polymerize with the desired comonomer, the use of the produced polymer, and cost. A preferred anionic monomer is acrylic acid.

In certain instances, it may be possible to chemically modify a non-ionic monomer component contains in the dispersion polymer of the invention after polymerization to obtain an anionic functional group, for example, the modification of an incorporated acrylamide mer unit to the corresponding sulfonate or phosphonate.

"Anionic dispersion polymer" means a dispersion polymer as defined herein which possesses a net negative charge.

"Nonionic monomer" means a monomer as defined herein which is electrically neutral. Representative nonionic monomers include acrylamide, methacrylamide, N-methylacrylamide, N-isopropylacrylamide, N-t-butyl acrylamide, N-methylolacrylamide, N, N-dimethyl(meth) acrylamide, N-isopropyl(meth)acrylamide, N-(2-hydroxypropyl)methacrylamide, N-methylolacrylamide, N-vinylformamide, N-vinylacetamide, N-vinyl-N-methylacetamide, poly(ethylene glycol)(meth)acrylate, poly (ethylene glycol) monomethyl ether mono(meth)acryate, N-vinyl-2-pyrrolidone, glycerol mono((meth)acrylate), 2-hydroxyethyl(meth)acrylate, vinyl methylsulfone, vinyl acetate, and the like. Preferred nonionic monomers of include acrylamide, methacrylamide, N-isopropylacrylamide, N-t-butyl acrylamide, and N-methylolacrylamide. More preferred nonionic monomers include acrylamide and methacrylamide. Acrylamide is still more preferred.

"Nonionic dispersion polymer" means a dispersion polymer as defined herein which is electrically neutral.

"Dispersion polymer" means a water-soluble polymer dispersed in an aqueous continuous phase containing one or more inorganic salts. In the process of dispersion polymerization, the monomer and the initiator are both soluble in Polymerization medium, but the medium is a poor solvent for the resulting polymer. Accordingly, the reaction mixture is homogeneous at the onset, and polymerization is initiated in a homogeneous solution. Depending on the solvency of the medium for the resulting oligomers or macroradicals and macromolecules, phase separation occurs at an early stage. This leads to nucleation and the formation of primary particles called "precursors" and the precursors are colloidally stabilized by adsorption of stabilizers. The particles are believed to be swollen by Polymerization medium and/or the monomer, leading to the formation of spherical particles having a size in the region of ~0.1–10.0 microns.

In any dispersion polymerization, the variables that are usually controlled are the concentrations of the stabilizer, the monomer and the initiator, solvency of the dispersion medium, and the reaction temperature. It has been found that these variables can have a significant effect on the particle size, the molecular weight of the final polymer particles, and the kinetics of Polymerization process.

Particles produced by dispersion polymerization in the absence of any stabilizer are not sufficiently stable and may coagulate after their formation. Addition of a small percentage of a suitable stabilizer to Polymerization mixture produces stable dispersion particles. Particle stabilization in dispersion polymerization is usually referred to as "steric stabilization". Good stabilizers for dispersion polymerization are polymer or oligomer compounds with low solubility in Polymerization medium and moderate affinity for the polymer particles.

As the stabilizer concentration is increased, the particle size decreases, which implies that the number of nuclei formed increases with increasing stabilizer concentration. The coagulation nucleation theory very well accounts for the observed dependence of the particle size on stabilizer concentration, since the greater the concentration of the stabilizer adsorbed the slower will be the coagulation step. This results in more precursors becoming mature particles, thus reducing the size of particles produced.

As the solvency of the dispersion medium increases, (a) the oligomers will grow to a larger MW before they become a precursor nuclei, (b) the anchoring of the stabilizer moiety will probably be reduced and (c) the particle size increases. As the initiator concentration is increased, it has been observed that the final particle size increases. As for the kinetics, it is reported that when the dispersion medium is a non-solvent for the polymer being formed, then the locus of polymerization is largely within the growing particles and the system follows the bulk polymerization kinetics, n (the kinetic chain length)=$R_p/R_t$, where $R_p$ is the propagation rate and $R_t$ is the termination rate. As the solvency of the dispersion medium for the growing polymer particle is increased, polymer growth proceeds in solution. The polymeric radicals that are formed in solution are then captured by growing particles. Consequently, the locus of the particle polymerization process changes and there is a concomitant change in the kinetics of polymerization.

The dispersion polymers of the instant invention contain from about 0.1 to about 5 weight percent based on the total weight of the dispersion of a stabilizer.

Stablizers as used herein include anionically charged water soluble polymers having a molecular weight of from about 100,000 to about 5,000,000 and preferably from about 1,000,000 to about 3,000,000. The stabilizer polymer must be soluble or slightly soluble in the salt solution, and must be soluble in water. The stabilizer polymers generally have an intrinsic viscosity in 1M NaNO₃ of from about 0.1–10 dl/g, preferably from about 0.5–7.0 dl/g and more preferably from about 2.0–6.0 dl/g at 30° C.

Preferred stabilizers are polyacrylic acid, poly(meth) acrylic acid, poly(2-acrylamido-2-methyl-1-propanesulfonic acid) and and copolymers of 2-acrylamido- 2-methyl-1-propanesulfonic acid and an anionic comonomer selected from acrylic acid and methacrylic acid.

The stabilizer polymers are prepared using conventional solution polymerization techniques, are prepared in water-in-oil emulsion form or are prepared in accordance with the dispersion polymerization techniques described herein. The choice of a particular stabilizer polymer will be based upon the particular polymer being produced, the particular salts contains in the salt solution, and the other reaction conditions to which the dispersion is subjected during the formation of the polymer.

Preferably from about 0.1 to about 5 percent by weight, more preferably from about 0.25 to about 1.5 percent and still more preferably, from about 0.4 to about 1.25 percent by weight of stabilizer, based on the weight of the total dispersion or finished product, is utilized.

Polymer dispersions prepared in the absence of the stabilizer component result in paste like slurries indicating that a stable dispersion did not form. The paste like products generally thickened within a relatively short period of time into a mass that could not be pumped or handled within the general applications in which polymers of this type are employed.

The remainder of the dispersion consists of an aqueous solution comprising from about 2 to about 40 weight percent based on the total weight of the dispersion of a water soluble salt selected from the group consisting of ammonium, alkali metal and alkaline earth metal halides, sulfates, and phosphates.

The salt is important in that the polymer produced in such aqueous media will be rendered insoluble on formation, and Polymerization will accordingly produce particles of water soluble polymer when suitable agitation is provided. The selection of the particular salt to be utilized is dependent upon the particular polymer to be produced, and the stabilizer to be employed. The selection of salt, and the amount of salt present should be made such that the polymer being produced will be insoluble in the salt solution. Particularly useful salts include a mixture of ammonium sulfate and sodium sulfate in such quantity to saturate the aqueous solution. While sodium sulfate may be utilized alone, we have found that it alters the precipitation process during Polymerization. Salts containing di- or trivalent anions are preferred because of their reduced solubility in water as compared to for example alkali, alkaline earth, or ammonium halide salts, although monovalent anion salts may be employed in certain circumstances. The use of salts containing di- or trivalent anions generally results in polymer dispersions having lower percentages of salt materials as compared to salts containing monovalent anions.

The particular salt to be utilized is determined by preparing a saturated solution of the salt or salts, and determining the solubility of the desired stabilizer and the desired polymer. Preferably from about 5 to about 30, more preferably from about 5 to about 25 and still more preferably from about 8 to about 20 weight percent based on the weight of the dispersion of the salt is utilized. When using higher quantities of monomer less salt will be required.

In addition to the above, other ingredients may be employed in making the polymer dispersions of the present invention. These additional ingredients may include chelating agents designed to remove metallic impurities from interfering with the activity of the free radical catalyst employed, chain transfer agents to regulate molecular weight, nucleating agents, and codispersant materials. Nucleating agents when utilized generally encompass a small amount of the same polymer to be produced. Thus if a polymer containing 70 mole percent acrylic acid (or its water soluble salts) and 30 percent acrylamide were to be produced, a nucleating agent or "seed" of the same or similar polymer composition may be utilized. Generally up to about 10 weight percent, preferably about 0.1 to about 5, more preferably from about 0.5 to about 4 and still more preferably from about 0.75 to about 2 weight percent of a nucleating agent is used based on the polymer contains in the dispersion is utilized.

Codispersant materials to be utilized include dispersants from the classes consisting of water soluble sugars, polyethylene glycols having a molecular weight of from about 2000 to about 50,000, and other polyhydric alcohol type materials. Amines and polyamines having from 2–12 carbon atoms are often times also useful as codispersant materials, but, must be used with caution because they may also act as chain transfer agents during Polymerization. The function of a codispersant is to act as a colloidal stabilizer during the early stages of Polymerization. The use of codispersant materials is optional, and not required to obtain the polymer dispersions of the invention. When utilized, the codispersant is present at a level of up to about 10, preferably from about 0.1–4 and more preferably from about 0.2–2 weight percent based on the dispersion.

The total amount of water soluble polymer prepared from the anionic and the nonionic water soluble monomers in the dispersion may vary from about 5 to about 50 percent by weight of the total weight of the dispersion, and preferably from about 10 to about 40 percent by weight of the dispersion. Most preferably the dispersion contains from about 15 to about 30 percent by weight of the polymer prepared from the nonionic and anionic water soluble monomers.

Polymerization reactions described herein are initiated by any means which results in generation of a suitable free-radical. Thermally derived radicals, in which the radical species results from thermal, homolytic dissociation of an azo, peroxide, hydroperoxide and perester compound are preferred. Especially preferred initiators are azo compounds including 2,2'-azobis (2-amidinopropane) dihydrochloride, 2,2'-azobis[2-(2-imidazolin-2-yl)propane]dihydrochloride, 2,2'-azobis(isobutyronitrile) (AIBN), 2,2'-azobis(2,4-dimethylvaleronitrile) (AIVN), and the like.

The monomers may be mixed together with the water, salt and stabilizer prior to Polymerization, or alternatively, one or both monomers may be added stepwise during Polymerization in order to obtain proper incorporation of the monomers into the resultant dispersion polymer. Polymerizations of this invention may be run at temperatures ranging from −10° C. to as high as the boiling point of the monomers employed. Preferably, the dispersion polymerization is conducted at from −10° C. to about 80° C. More preferably, Polymerization is conducted at from about 30° C. to about 45° C.

The dispersion polymers of this invention are prepared at a pH greater than 5, preferably at a pH of about 7. After polymerization the pH of the dispersion may be adjusted to any desired value as long as the polymer remains insoluble to maintain the dispersed nature. Preferably, Polymerization is conducted under inert atmosphere with sufficient agitation to maintain the dispersion.

The dispersion polymers of the instant invention typically have bulk solution viscosities of less than about 25,000 cps at 25° C. (Brookfield), more preferably less than 5,000 cps and still more preferably less than about 2,000 cps. At these viscosities, the polymer dispersions are easily handled in conventional polymerization equipment.

The dispersion polymers of this invention typically have molecular weights ranging from about 50,000 up to the aqueous solubility limit of the polymer. Preferably, the dispersions have a molecular weight of from about 1,000,000 to about 50 million.

In a preferred embodiment, this invention is directed to dispersion polymers wherein the anionic monomer is selected from the group consisting of acrylic acid, methacrylic acid, 2-acrylamido-2-methyl-1-propanesulfonic acid, acrylamidomethylbutanoic acid, maleic acid, fumaric acid, itaconic acid, vinyl sulfonic acid, styrene sulfonic acid, vinyl phosphonic acid, allyl sulfonic acid, allyl phosphonic acid, sulfomethylated acrylamide, phosphonomethylated acrylamide and the water soluble alkali metal, alkaline earth metal, and ammonium salts thereof and the nonionic monomer is selected from the group consisting of acrylamide, methacrylamide, N-isopropylacrylamide, N-t-butyl acrylamide, and N-methylolacrylamide.

In another preferred embodiment, the anionic monomer is acrylic acid or a water soluble alkali metal, alkaline earth metal, or ammonium salt thereof and the nonionic monomer is acrylamide.

In another preferred embodiment, the stabilizer is an anionic polymer selected from polyacrylic acid, poly(meth) acrylic acid, poly(2-acrylamido-2-methyl-1-propanesulfonic acid); poly(2-acrylamido-2-methyl-1-propanesulfonic acid/acrylic acid) and poly(2-acrylamido-2-methyl-1-propanesulfonic acid/methacrylic acid).

In a more preferred embodiment, the stabilizer has a concentration of from about 0.25 to about 2 weight percent based on the total weight of the dispersion and an intrinsic viscosity in 1M $NaNO_3$ of from about 0.75 to about 7.0 dl/g.

In another more preferred embodiment, the stabilizer is poly(2-acrylamido-2-methyl-1-propanesulfonic acid/acrylic acid) comprising from about 3 to about 80 mole percent 2-acrylamido-2-methyl-1-propanesulfonic acid and from about 97 to about 20 mole percent acrylic acid.

In another more preferred embodiment, the stabilizer is poly(2-acrylamido-2-methyl-1-propanesulfonic acid/ methacrylic acid) comprising from about 5 to about 90 mole percent 2-acrylamido-2-methyl-1-propanesulfonic acid and from about 95 to about 10 mole percent methacrylic acid.

In a still more preferred embodiment, the water-soluble polymer is poly(acrylic acid/acrylamide) having a mole ratio of about 7:93 for acrylic acid to acrylamide.

In another still more preferred embodiment, the water-soluble polymer is poly(acrylic acid/acrylamide) having a mole ratio of about 7:93 for acrylic acid to acrylamide and the stabilizer is poly(2-acrylamido-2-methyl-1-propanesulfonic acid/acrylic acid) having a mole ratio of about 7:93 for 2-acrylamido-2-methyl-1-propanesulfonic acid to acrylic acid.

In another still more preferred embodiment, the water-soluble polymer is poly(acrylic acid/acrylamide) having a mole ratio of about 7:93 for acrylic acid to acrylamide and the stabilizer is poly(2-acrylamido-2-methyl-1-propanesulfonic acid/methacrylic acid) comprising from about 20 to about 30 mole percent 2-acrylamido-2-methyl-1-propanesulfonic acid and from about 80 to about 70 mole percent methacrylic acid.

In another still more preferred aspect, the water-soluble polymer is polyacrylamide.

In another still more preferred aspect, the water-soluble polymer is polyacrylamide and the stabilizer is [preferred stabilizer(s) for nonionic dispersions].

In another aspect, this invention is directed to a method of preparing a high molecular weight dispersion polymer having a bulk Brookfield viscosity of from about 10 to about 25,000 cps at 25° C. comprising
a) adding a free-radical initiator to an aqueous mixture comprising:
   i. from about 5 to about 50 weight percent of a mixture comprising 0–100 mole percent of at least one anionic monomer and 100–0 mole percent of at least one non-ionic vinyl monomer;
   ii. from about 0.1 to about 5 weight percent based on the total weight of the dispersion of a stabilizer, wherein the stabilizer is an anionic water soluble polymer having an intrinsic viscosity in 1M $NaNO_3$ of from about 0.1–10 and
   iii. from about 5 to about 40 weight percent based on the weight of the dispersion of a water soluble salt selected from the group consisting of ammonium, alkali metal and alkaline earth metal halides, sulfates, and phosphates; and
b) polymerizing the monomers.

The foregoing may be better understood by reference to the following examples, which are presented for purposes of illustration and are not intended to limit the scope of the invention.

ACRYLIC ACID, 2-ACRYLAMIDO-2-METHYL-1-PROPANESULFONIC ACID AND ACRYLIC ACID/2-ACRYLAMIDO-2-METHYL-1-PROPANESULFONIC ACID COPOLYMER STABILIZERS

EXAMPLE 1

To a 1.5-liter resin reactor equipped with stirrer, temperature controller, and water cooled condenser is added 906.79 g of deionized water, 200 g of acrylic acid, 220.34 g of a 50% solution of sodium hydroxide (ph=7.0) and 0.20 g of EDTA. The resulting solution is sparged with 1000 cc/min. of nitrogen, heated to 45° C. and 1.00 g of a 12% solution of sodium bisulfite and 5.00 g of a 10% solution of 2,2' azobis(N,N'2-amidinopropane) dihydrochloride (V-50, Wako Chemicals, Richmond, Va., USA) are added. Polymerization begins within 5 minutes and after 20 minutes, the solution becomes viscous and the temperature of the reaction rises to 80° C. The reaction is continued for a total of 16 hours at 78–82° C. The resulting polymer has a Brookfield viscosity of 60000 cps at 25° C. and contains 15% of a homopolymer of acrylic acid with an intrinsic viscosity of 2.08 dl/gm in 1.0 molar $NaNO_3$.

EXAMPLE 2

To a 1.5-liter resin reactor equipped with stirrer, temperature controller, and water cooled condenser is added 910.75 g of deionized water, 49.45 g of a 58% solution of the sodium salt of 2-acrylamido-2-methyl-1-propanesulfonic acid (AMPS), 171.32 g of acrylic acid, 187.17 g of a 50% solution of sodium hydroxide (ph=7.0) and 0.20 g of EDTA. The resulting solution is sparged with 1000 cc/min. of nitrogen, heated to 45° C. and 1.00 g of a 25% solution of sodium bisulfite and 5.00 g of a 10% solution of V-50 are added. Polymerization begins within 5 minutes and after 15 minutes, the solution becomes viscous and the temperature of the reaction rises to 80° C. The reaction is continued for a total of 16 hours at 78–82° C. The resulting polymer solution has a Brookfield viscosity of 15100 cps at 25° C. and contains 15% of a 87/13 w/w copolymer of acrylic acid/AMPS with an intrinsic viscosity of 1.95 dl/gm in 1.0 molar $NaNO_3$.

EXAMPLE 3

To a 1.5-liter resin reactor equipped with stirrer, temperature controller, and water cooled condenser is added 909.02 g of deionized water, 12.76 g of a 58% solution of the sodium salt of 2-acrylamido-2-methyl-1-propanesulfonic acid (AMPS), 193.25 g of acrylic acid, 212.10 g of a 50% solution of sodium hydroxide (ph=7.0) and 0.20 g of EDTA. The resulting solution is sparged with 1000 cc/min. of nitrogen and heated to 45° C. Then 1.00 g of a 12.5% solution of sodium bisulfite and 5.00 g of a 10% solution of V-50 are added. Polymerization begins within 5 minutes and after 15 minutes, the solution becomes viscous and the temperature of the reaction rises to 80° C. The reaction is continued for a total of 16 hours, during which time the temperature is maintained at 78–82° C. The resulting polymer solution has a Brookfield viscosity of 56000 cps at 25° C. and contains 15% of a 97/3 w/w copolymer of acrylic acid/AMPS with an intrinsic viscosity of 2.19 dl/gm in 1.0 molar $NaNO_3$.

EXAMPLE 4

To a 1.5-liter resin reactor equipped with stirrer, temperature controller, and water cooled condenser is added 911.1 g of deionized water, 26.17 g of a 58% solution of the sodium salt of 2-acrylamido-2-methyl-1-propanesulfonic acid (AMPS), 186.27 g of acrylic acid, 203.58 g of a 50% solution of sodium hydroxide (pH=7.0) and 0.20 g of EDTA. The resulting solution is sparged with 1000 cc/min. of nitrogen and heated to 45° C. Then 1.00 g of a 12.5% solution of sodium bisulfite and 5.00 g of a 10% solution of V-50 are added. Polymerization begins within 5 minutes and after 15 minutes, the solution becomes viscous and the temperature of the reaction rises to 80° C. The reaction is continued for a total of 16 hours at 78–82° C. The resulting polymer solution has a Brookfield viscosity of 69500 cps at 25° C. and contains 15% of a 93/7 w/w copolymer of acrylic acid/AMPS with an intrinsic viscosity of 2.44 dl/gm in 110 molar $NaNO_3$

EXAMPLE 5

To a 1.5-liter resin reactor equipped with stirrer, temperature controller, and water cooled condenser is added 916.1. g of deionized water, 86.89 g of a 58% solution of the sodium salt of 2-acrylamido-2-methyl-1-propanesulfonic acid (AMPS), 154.47 g of acrylic acid 169.6 g of a 50% solution of sodium hydroxide (pH=7.0) and 0.20 g of EDTA. The resulting solution is sparged with 1000 cc/min. of nitrogen, heated to 45° C. and 1.00 g of a 25% solution of sodium bisulfite and 5.00 g of a 10% solution of V-50 are added. Polymerization begins within 5 minutes and after 15 minutes the solution becomes viscous and the temperature of the reaction rises to 80° C. The reaction is continued for a total of 16 hours at 78–82° C. The resulting polymer solution has a Brookfield viscosity of 61000 cps at 25° C. and contains 15% of a 77/23 w/w copolymer of acrylic acid/AMPS with an intrinsic viscosity of 2.49 dl/gm in 1.0 molar $NaNO_3$.

EXAMPLE 6

To a 1.5-liter resin reactor equipped with stirrer, temperature controller, and water cooled condenser is added 923.5 g of deionized water, 152.58 g of a 58% solution of the sodium salt of 2-acrylamido-2-methyl-1-propanesulfonic acid (AMPS), 120 g of acrylic acid, 131.05 g of a 50% solution of sodium hydroxide (pH=7.0) and 0.20 g of EDTA. The resulting solution is sparged with 1000 cc/min. of nitrogen, heated to 45° C. and 1.00 g of a 10% solution of sodium bisulfite and 5.00 g of a 10% solution of V-50 are added. Polymerization begins within 5 minutes and after 15 minutes, the solution becomes viscous and the temperature of the reaction rises to 80° C. The reaction is continued for a total of 16 hours at 78–82° C. The resulting polymer solution has a Brookfield viscosity of 12500 cps at 25° C. and contains 15% of a 93/7 w/w copolymer of acrylic acid/AMPS with an intrinsic viscosity of 2.35 dl/gm in 1.0 molar $NaNO_3$.

EXAMPLE 7

To a 1.5-liter resin reactor equipped with stirrer, temperature controller, and water cooled condenser is added 1690.19 g of deionized water, 229.01 g of a 58% solution of the sodium salt of 2-acrylamido-2-methyl-1-propanesulfonic acid (AMPS), 80 g of acrylic acid and 0.20 g of EDTA. The resulting solution is sparged with 1000 cc/min. of nitrogen, heated to 72° C. and 0.10 g of sodium bisulfite and 0.50 g of V-50 are added. Polymerization begins within 5 minutes and after 10 minutes, the solution becomes viscous and the temperature of the reaction rises to 80° C. The reaction is continued for a total of 16 hours at 78–82° C. The resulting polymer solution has a Brookfield viscosity of 1000 cps at 25° C. and contains 10 of a 60/40 w/w copolymer of acrylic acid/AMPS with an intrinsic viscosity of 2.79 dl/gm in 1.0 molar $NaNO_3$.

EXAMPLE 8

To a 1.5-liter resin reactor equipped with stirrer, temperature controller, and water cooled condenser is added 654.9 g of deionized water, 344.8 g of a 58% solution of the sodium salt of 2-acrylamido-2-methyl-1-propanesulfonic acid (AMPS), and 0.20 g of EDTA. The resulting solution is sparged with 1000 cc/min. of nitrogen, heated to 55° C. and 0.10 g of V-50 is added. Polymerization begins within 15 minutes and the solution becomes viscous. The reaction is continued for 16 hours at 53–57° C. After 16 hours the reaction mixture is heated to a temperature of 80° C. and maintained at a temperature of 78–82° C. for 24 additional hours. To the resulting polymer solution is added 666.67 g of water. The resulting polymer solution has a Brookfield viscosity of 38000 cps at 25° C. and contains 12% of 100% homopolymer of the sodium salt of AMPS with an intrinsic viscosity of 3.99 dl/gm in 1.0 molar $NaNO_3$.

EXAMPLE 9

To a 1.5-liter resin reactor equipped with stirrer, temperature controller, and water cooled condenser is added 627.86 g of deionized water, 350.93 g of a 58% solution of the sodium salt of 2-acrylamido-2-methyl-1-propancsulfonic acid (AMPS), 16.01 g of acrylic acid, (pH=3.0) and 0.20 g of EDTA. The resulting solution is sparged with 1000 cc/min. of nitrogen, heated to 46° C. and 5.00 g of a 10% solution of V-50 is added. Polymerization begins within 10 minutes, the solution becomes viscous and the temperature of the reaction rises to 56° C. The reaction is continued for 7 hours at 53–57° C. After 7 hours, 666.67 g of water is added and the reaction mixture is heated to a temperature of 80° C. and maintained at a temperature of 780–82° C. for 16 additional hours. The resulting polymer solution has a Brookfield viscosity of 94250 cps at 25C and contains 12% of a 92/08 w/w copolymer (80/20 M/M) of AMPS/acrylic acid with an intrinsic viscosity of 5.17 dl/gm in 1.0 molar $NaNO_3$ at a pH of 7.0.

EXAMPLE 10

To a 1.5-liter resin reactor equipped with stirrer, temperature controller, and water cooled condenser is added 1690.19 g of deionized water, 229.01 g of a 58% solution of the sodium salt of 2-acrylamido-2-methyl-1-propanesulfonic acid (AMPS), 80.00 g of acrylic acid, (pH=3.0) and 0.20 g of EDTA. The resulting solution is sparged with 1000 cc/min. of nitrogen, heated to 72° C. and 0.10 g of sodium bisulfite and 0.50 g of V-50 are added. Polymerization begins within 10 minutes, the solution becomes viscous and the temperature of the reaction rises to 80° C. The reaction is continued for 24 at 78–82° C. The resulting polymer solution has a Brookfield viscosity of 1000 cps at 25C and contains 10% of a 60/40 w/w copolymer (34/66 M/M) of AMPS/acrylic acid with an intrinsic viscosity of 2.79 dl/gm in 1.0 molar $NaNO_3$ at a pH of 7.0.

EXAMPLE 11

To a 1.5-liter resin reactor equipped with stirrer, temperature controller, and water cooled condenser is added 1393.29 g of deionized water, 152.58 g of a 58% solution of the sodium salt of 2-acrylamido-2-methyl-1-propanesulfonic acid (AMPS), 120.00 g of acrylic acid, (pH=3.0) and 0.20 g of EDTA. The resulting solution is sparged with 1000 cc/min. of nitrogen, heated to 73° C. and 0.50 g of sodium bisulfite and 0.50 g of V-50 are added. Polymerization begins within 5 minutes, the solution becomes viscous and the temperature of the reaction rises to 79° C. The reaction is continued for 45 hours at 77–83° C. The resulting polymer solution has a Brookfield viscosity of 487.5 cps at 25° C. and contains 12% of a 40/60 w/w copolymer (19/81 M/M) of AMPS/acrylic acid with an intrinsic viscosity of 2.02 dl/gm in 1.0 molar $NaNO_3$ at a pH of 7.0.

EXAMPLE 12

To a 1.5-liter resin reactor equipped with stirrer, temperature controller, and water cooled condenser is added 1758.19 g of deionized water, 86.89 g of a 58% solution of the sodium salt of 2-acrylamido-2-methyl-1-propanesulfonic acid (AMPS), 154.47 g of acrylic acid, (pH=3.0) and 0.20 g of EDTA. The resulting solution is sparged with 1000 cc/min. of nitrogen, heated to 79° C. and 0.25 g of sodium bisulfite and 0.50 g of V-50 are added. Polymerization begins within 5 minutes, the solution becomes viscous and the temperature of the reaction rises to 84° C. The reaction is continued for a total of 16 hours at 78–82° C. The resulting polymer solution has a Brookfield viscosity of 1465 cps at 25° C. and contains 10% of a 77/23 w/w copolymer (90.7/9.3 M/M) of acrylic acid/AMPS with an intrinsic viscosity of 3.36 dl/gm in 1.0 molar $NaNO_3$ at a pH of 7.0.

EXAMPLE 13

To a 1.5-liter resin reactor equipped with stirrer, temperature controller, and water cooled condenser is added 1798.8 g of deionized water, 200.00 g of acrylic acid, (pH=3.0) and 0.20 g of EDTA. The resulting solution is sparged with 1000 cc/min. of nitrogen, heated to 72° C. and 0.50 g of sodium bisulfite and 0.50 g of V-50 are added. Polymerization begins within 5 minutes, the solution becomes viscous and the temperature of the reaction rises to 80° C. The reaction is continued for a total of 40 hours at 77–83° C. The resulting polymer solution has a Brookfield viscosity of 2200 cps at 25° C. and contains 10% of a 100% homopolymer of acrylic acid with an intrinsic viscosity of 3.72 dl/gm in 1.0 molar $NaNO_3$ at a pH of 7.0.

EXAMPLE 14

To a 1.5-liter resin reactor equipped with stirrer, temperature controller, and water cooled condenser is added 1444.85 g of deionized water, 40.40 g of a 48.9% solution of acrylamide, 180.25 g of acrylic acid, (pH=3.0) and 0.20 g of EDTA. The resulting solution is sparged with 1000 cc/min. of nitrogen, heated to 75° C. and 0.50 g of sodium bisulfite and 0.50 g of V-50 are added. Polymerization begins within 5 minutes, the solution becomes viscous and the temperature of the reaction rises to 85° C. The reaction is continued for a total of 25 hours at 79–88° C. The resulting polymer solution has a Brookfield viscosity of 7040 cps at 25° C. and contains 12% of a 90/10 W/W copolymer (90/10 M/M) of acrylic acid/acrylamide with an intrinsic viscosity of 3.59 dl/gm in 1.0 molar $NaNO_3$ at a pH of 7.0.

EXAMPLE 15

To a 1.5-liter resin reactor equipped with stirrer, temperature controller, and water cooled condenser is added 862.36 g of deionized water, 76.29 g of a 58% solution of the sodium salt of 2-acrylamido-2-methyl-1-propanesulfonic acid (AMPS), 60.00 g of acrylic acid, (pH=3.0) and 0.10 g of EDTA. The resulting solution is sparged with 1000 cc/min. of nitrogen, heated to 60° C. and 1.25 g of a solution of V-50 is added. Polymerization begins within 15 minutes, the solution becomes viscous and the temperature of the reaction rises to 65° C. The reaction is continued for a total of 6 hours at 63–67° C. After 6 hours the reaction mixture is heated to a temperature of 80° C. and maintained at a temperature of 78–82° C. for 12 additional hours. The resulting polymer solution has a Brookfield viscosity of 63300 cps at 25° C. and contains 10% of a 40/60 w/w copolymer (19/81 M/M) of AMPS/acrylic acid with an intrinsic viscosity of 8.02 dl/gm in 1.0 molar $NaNO_3$ at a pH of 7.0.

EXAMPLE 16

To a 1.5-liter resin reactor equipped with stirrer, temperature controller, and water cooled condenser is added 1464.47 g of deionized water, 200.00 g of acrylic acid, (pH=3.0) and 0.20 g of EDTA. The resulting solution is sparged with 1000 cc/min. of nitrogen, heated to 75° C. and 1.50 g of sodium bisulfite and 0.50 g of V-50 are added. Polymerization begins within 5 minutes, the solution becomes viscous and the temperature of the reaction rises to 87° C. The reaction is continued for a total of 26 hours at 78–84° C. The resulting polymer solution has a Brookfield viscosity of 440 cps at 25° C. and contains 12% of a 100% homopolymer of acrylic acid with an intrinsic viscosity of 1.87 dl/gm in 1.0 molar $NaNO_3$ at a pH of 7.0.

EXAMPLE 17

To a 1.5-liter resin reactor equipped with stirrer, temperature controller, and water cooled condenser is added 923.03 g of deionized water, 152.58 g of a 58% solution of the sodium salt of 2-acrylamido-2-methyl-1-propanesulfonic acid (AMPS), 120.00 g of acrylic acid, 131.50 g of 50% sodium hydroxide (pH=7.0) and 0.20 g of EDTA. The resulting solution is sparged with 1000 cc/min. of nitrogen, heated to 45° C. and 1.0 g of a 7.5% solution of sodium bisulfite and 5.00 g of a 10% solution of V-50 are added. Polymerization begins within 10 minutes, the solution becomes viscous and the temperature of the reaction rises to 78° C. The reaction is continued for 25 hours at 78–82° C. The resulting polymer solution has a Brookfield viscosity of 19250 cps at 25° C. and contains 15% of a 40/60 w/w copolymer (19/81 M/M) of AMPS/acrylic acid with an intrinsic viscosity of 1.94 dl/gm in 1.0 molar NaNO₃ at a pH of 7.0.

The properties of the anionic stabilizers prepared in Examples 1–17 are summarized in Table 1.

TABLE 1

AA and AA/AMPS Copolymer Stabilizers

| Example | Stabilizer AA/AMPS wt/wt | Stabilizer AA/AMPS mol/mol | RSV @1.0% dl/gm | IV dl/gm | VISC cp. |
|---|---|---|---|---|---|
| 1 | 100/0 | 100/0 | 3.60 | 2.08 | 60000 |
| 2 | 87/13 | 95.0/5.0 | 2.94 | 1.95 | 15100 |
| 3 | 97/3 | 98.75/1.25 | 3.87 | 2.19 | 56000 |
| 4 | 93/7 | 97.5/2.5 | 4.58 | 2.44 | 69500 |
| 5 | 77/23 | 90.7/9.3 | 4.39 | 2.49 | 61000 |
| 6 | 93/7 | 97.5/2.5 | 3.91 | 2.35 | 12500 |
| 7 | 60/40 | 80/20 | 2.99 | 2.79 | 1000 |
| 8 | 0/100 | 0/100 |  | 3.99 | 38000 |
| 9 | 8/92 | 20/80 |  | 5.17 | 94250 |
| 10 | 40/60 | 66/34 |  | 2.79 | 1000 |
| 11 | 60/40 | 81/19 |  | 2.02 | 487.5 |
| 12 | 77/23 | 90.7/9.3 |  | 3.36 | 1465 |
| 13 | 100/0 | 100/0 |  | 3.72 | 2200 |
| 14 | 90/10 | 90/10 |  | 3.59 | 7040 |
| 15 | 60/40 | 81/19 |  | 8.02 | 63300 |
| 16 | 100/0 | 100/0 |  | 1.87 | 440 |
| 17 | 60/40 | 81/19 |  | 1.94 | 19250 |

POLYMER DISPERSIONS WITH AA AND AA/AMPS STABILIZERS

EXAMPLE 18

To a 1.5-liter resin reactor equipped with stirrer, temperature controller, and water cooled condenser is added 361.8 g of deionized water, 114 g of sodium sulfate, 76 g of ammonium sulfate, 0.53 g of sodium formate, 40 g of a 15% solution of a homopolymer of acrylic acid (Example 1), 374.8 g of a 49.6% solution of acrylamide (185.82 g), 14.18 g of acrylic acid, 14.85 g of 50% sodium hydroxide, and 0.33 g of EDTA. The mixture is heated to 35° C. and 0.30 g of a 1% solution of 2,2' azobis(N,N'-dimethylene isobutryramidine) dihydrochloride (VA-044, Wako Pure Chemical Industries Ltd., Osaka, Japan) is added. The resulting solution is sparged with 1000 cc/min. of nitrogen. After 60 minutes, polymerization begins and the solution becomes viscous. After 3 hours, the mixture is a milky paste and 0.30 g of a 1% solution of VA-044 is added. After 4 hours the mixture is a milky dispersion and 0.3 g of a 1% solution of VA-044 is added. After 5 hours 1.2 g of a 1% solution of VA-044 is added. After 7 hours 2.9 g of a 1% solution of VA-044 is added. After 8 hours 2.90 g of a 2% solution of VA-044 is added. The reaction is continued for a total of 16 hours at 34–36° C. To the resulting dispersion polymer is added 12 g of sodium sulfate and 8 g of ammonium sulfate. The resulting polymer dispersion has a Brookfield viscosity of 1035 cps, a pH of 7.0, and contains 20% of a 93/7 copolymer of acrylamide/acrylic acid with a reduced specific viscosity of 17.4 dl/gm at 0.045% in 1.0 N NaNO₃.

EXAMPLE 19

To a 1.5-liter resin reactor equipped with stirrer, temperature controller, and water cooled condenser is added 360.6 g of deionized water, 114 g of sodium sulfate, 76 g of ammonium sulfate, 0.53 g of sodium formate, 40 g of a 15% solution of an 87/13 w/w copolymer of acrylic acid/Amps (Example 2), 376.15 g of a 49.4% solution of acrylamide (185.82 g), 14.18 g of acrylic acid, 15.70 g of 50% sodium hydroxide, and 0.33 g of EDTA. The mixture is heated to 35° C. and 0.30 g of a 1% solution of VA-044 is added. The resulting solution is sparged with 1000 cc/min. of nitrogen. After 60 minutes, polymerization begins and the solution becomes viscous. After 210 minutes, the mixture is a milky paste and 0.60 g of a 1% solution of VA-044 is added. After 6.5 hours the mixture is a milky dispersion and 1.2 g of a 1% solution of VA-044 is added. After 8 hours 2.9 g of a 1% solution of VA-044 is added. The reaction is continued for a total of 16 hours at 34–36° C. To the resulting dispersion polymer is added 12 g of sodium sulfate and 8 g of ammonium sulfate. The resulting polymer dispersion has a Brookfield viscosity of 790 cps, a pH of 7.0, and contains 20% of a 93/7 copolymer of acrylamide/acrylic acid with a reduced specific viscosity with a reduced specific viscosity of 17.1 dl/gm at 0.045% in 1.0 N NaNO₃.

EXAMPLE 20

To a 1.5-liter resin reactor equipped with stirrer, temperature controller, and water cooled condenser, is added 442.44 g of deionized water, 126 g of sodium sulfate, 84 g of ammonium sulfate, 0.40 g of sodium formate, 40 g of a 15% solution of an 87/13 w/w copolymer of acrylic acid/Amps (Example 2), 280.99 g of a 49.6% solution of acrylamide (139.36 g), 10.64 g of acrylic acid, 11.65 g of 50% sodium hydroxide, 0.40 g of sodium formate, and 0.25 g of EDTA. The mixture is heated to 35° C. and 0.30 g of a 4% solution of VA-044 is added. The resulting solution is sparged with 1000 cc/min. of nitrogen. After 30 minutes, polymerization begins and the solution becomes viscous. After 2 hours, the mixture is a milky dispersion and 0.30 g of a 4% solution of VA-044 is added. After 4 hours 0.30 g of a 4% solution of VA-044 is added. After 5 hours 1.20 g of a 4% solution of VA-044 is added. After 8 hours 2.90 g of a 4% solution of VA-044 is added. The reaction is continued for a total of 16 hours at 34–36° C. The resulting polymer dispersion has a Brookfield viscosity of 2950 cps. To the resulting dispersion polymer is added 6 g of sodium sulfate and 4 g of ammonium sulfate. The resulting polymer dispersion has a Brookfield viscosity of 1200 cps, a pH of 7.0, and contains 15% of a 93/7 copolymer of acrylamide/acrylic acid with a reduced specific viscosity of 23.1 dl/gm at 0.045% in 1.0 N NaNO₃.

EXAMPLE 21

To a 1.5-liter resin reactor equipped with stirrer, temperature controller, and water cooled condenser is added 442.1 g of deionized water, 126 g of sodium sulfate,84 g of ammonium sulfate, 0.40 g of sodium formate, 40 g of a 15% solution of an 97/3 w/w copolymer of acrylic acid/Amps (Example 3), 280.99 g of a 49.6% solution of acrylamide (139.36 g), 10.64 g of acrylic acid, 12.00 g of 50% sodium hydroxide, 0.40 g of sodium formate and 0.25 g of EDTA. The mixture is heated to 35° C. and 0.30 g of a 4% solution of VA-044 is added. The resulting solution is sparged with 1000 cc/min. of nitrogen. After 30 minutes, polymerization begins and the solution becomes viscous. After 2 hours, the mixture is a milky dispersion and 0.30 g of a 4% solution of VA-044 is added. After 4 hours 0.30 g of a 4% solution of VA-044 as added. After 5 hours 1.20 g of a 4% solution of VA-044 is added. After 8 hours 2.90 g of a 4% solution of VA-044 is added. The reaction is continued for a total of 16 hours at 34–36° C. The resulting polymer dispersion has a Brookfield viscosity of 5500 cps. To the resulting dispersion polymer is added 6 g of sodium sulfate and 4 g of ammonium sulfate. The resulting polymer dispersion has a Brookfield viscosity of 1335 cps, a pH of 7.0, and contains 15% of a 93/7 copolymer of acrylamide/acrylic acid with a reduced specific viscosity of 22.2 dl/gm at 0.045% in 1.0 N $NaNO_3$.

EXAMPLE 22

To a 1.5-liter resin reactor equipped with stirrer, temperature controller, and water cooled condenser is added 361.8 g of deionized water, 1 14 g of sodium sulfate,76 g of ammonium sulfate, 0.53 g of sodium formate, 40 g of a 15% solution of a 97/3 w/w copolymer of acrylic acid/AMPS (Example 3), 374.8 g of a 49.6% solution of acrylamide (185.82 g), 14.18 g of acrylic acid, 15.85 g of 50% sodium hydroxide and 0.33 g of EDTA. The mixture is heated to 35° C. and 0.30 g of a 1% solution of VA-044 is added. The resulting solution is sparged with 1000 cc/min. of nitrogen. After 60 minutes, polymerization begins and the solution becomes viscous. After 3 hours, the mixture is a milky paste and 0.30 g of a 1% solution of VA-044 is added. After 4 hours, the mixture is still a milky paste and 0.30 g of a 1% solution of VA-044 is added. After 5.5 hours the mixture is a milky dispersion and 1.2 g of a 1% solution of VA-044 is added. After 7 hours 2.9 g of a 1% solution of VA-044 is added. The reaction is continued for a total of 16 hours at 34–36° C. To the resulting dispersion polymer is added 12 g of sodium sulfate and 8 g of ammonium sulfate. The resulting polymer dispersion has a Brookfield viscosity of 1275 cps, a pH of 7.0, and contains 20% of a 93/7 copolymer of acrylamide/acrylic acid with a reduced specific viscosity of 18.8 dl/gm at 0.045% in 1.0 N $NaNO_3$.

EXAMPLE 23

To a 1.5-liter resin reactor equipped with stirrer, temperature controller, and water cooled condenser is added 442.4 g of deionized water, 126 g of sodium sulfate, 84 g of ammonium sulfate, 0.40 g of sodium formate, 40 g of a 15% solution of an 93/7 w/w copolymer of acrylic acid/Amps (Example 4), 280.99 g of a 49.6% solution of acrylamide (139.36 g), 10.64 g of acrylic acid, 11.70 g of 50% sodium hydroxide, 0.40 g of sodium formate and 0.25 g of EDTA. The mixture is heated to 35° C. and 0.30 g of a 4% solution of VA-044 is added. The resulting solution is sparged with 1000 cc/min. of nitrogen. After 30 minutes, polymerization begins and the solution becomes viscous. After 2 hours, the mixture is a milky dispersion and 0.30 g of a 4% solution of VA-044 is added. After 4 hours 0.30 g of a 4% solution of VA-044 is added. After 6 hours 1.20 g of a 4% solution of VA-044 is added. After 8 hours 2.90 g of a 4% solution of VA-044 is added. The reaction is continued for a total of 16 hours at 34–36° C. The resulting polymer dispersion has a Brookfield viscosity of 2500 cps. To the resulting dispersion polymer is added 6 g of sodium sulfate and 4 g of ammonium sulfate. The resulting polymer dispersion has a Brookfield viscosity of 710 cps, a pH of 7.0, and contains 15% of a 93/7 copolymer of acrylamide/acrylic acid with a reduced specific viscosity of 23.2 dl/gm at 0.045% in 1.0 N $NaNO_3$.

EXAMPLE 24

To a 1.5-liter resin reactor equipped with stirrer, temperature controller, and water cooled condenser is added 362.0 g of deionized water, 114 g of sodium sulfate,76 g of ammonium sulfate, 0.53 g of sodium formate, 40 g of a 15% solution of a 93/7 w/w copolymer of acrylic acid/AMPS (Example 4), 374.8 g of a 49.6% solution of acrylamide (185.82 g), 14.18 g of acrylic acid, 15.65 g of 50% sodium hydroxide, and 0.33 g of EDTA. The mixture is heated to 35° C. and 0.30 g of a 1% solution of VA-044 is added. The resulting solution is sparged with 1000 cc/min. of nitrogen. After 60 minutes, polymerization begins and the solution becomes viscous. After 3 hours, the mixture is a milky dispersion and 0.60 g of a 1% solution of VA-044 is added. After 4.5 hours, 1.2 g of a 1% solution of VA-044 is added. After 5.5 hours, 2.9 g of a 1% solution of VA-044 is added. After 6.5 hours 5.0 g of a 1% solution of VA-044 is added. The reaction is continued for a total of 16 hours at 34–36° C. To the resulting dispersion polymer is added 12 g of sodium sulfate and 8 g of ammonium sulfate. The resulting polymer dispersion has a Brookfield viscosity of 2220 cps, a pH of 7.0, and contains 20% of a 93/7 copolymer of acrylamide/acrylic acid with a reduced specific viscosity of 18.8 dl/gm at 0.045% in 1.0 N $NaNO_3$.

EXAMPLE 25

To a 1.5-liter resin reactor equipped with stirrer, temperature controller, and water cooled condenser is added 442.3 g of deionized water,126 g of sodium sulfate,84 g of ammonium sulfate, 0.40 g of sodium formate, 40 g of a 15% solution of an 77/23 w/w copolymer of acrylic acid/Amps (Example 5), 282.12 g of a 49.4% solution of acrylamide (139.36 g), 10.64 g of acrylic acid, 11.67 g of 50% sodium hydroxide, 0.40 g of sodium formate, and 0.25 g of EDTA. The mixture is heated to 35° C. and 0.30 g of a 4% solution of VA-044 is added. The resulting solution is sparged with 1000 cc/min. of nitrogen. After 30 minutes, polymerization begins and the solution becomes viscous. After 2 hours, the mixture is a milky dispersion and 0.30 g of a 4% solution of VA-044 is added. After 4 hours 0.30 g of a 4% solution of VA-044 is added. After 5 hours 1.20 g of a 4% solution of VA-044 is added. After 7 hours 2.90 g of a 4% solution of VA-044 is added. The reaction is continued for a total of 16 hours, during which time the temperature is maintained at 34–36° C. The resulting polymer dispersion has a Brookfield viscosity of 3650 cps. To the resulting dispersion polymer is added 6 g of sodium sulfate and 4 g of ammonium sulfate. The resulting polymer dispersion has a Brookfield viscosity of 825 cps, a pH of 7.0, and contains 15% of a 93/7 copolymer of acrylamide/acrylic acid with a reduced specific viscosity of 21.1 dl/gm at 0.045% in 1.0 N $NaNO_3$.

EXAMPLE 26

To a 1.5-liter resin reactor equipped with stirrer, temperature controller, and water cooled condenser is added 360.7 g of deionized water, 114 g of sodium sulfate, 76 g of ammonium sulfate, 0.53 g of sodium formate, 40 g of a 15% solution of a 77/23 w/w copolymer of acrylic acid/AMPS (Example 5), 376.15 g of a 49.4% solution of acrylamide (185.82 g), 14.18 g of acrylic acid, 15.60 g of 50% sodium hydroxide, and 0.33 g of EDTA. The mixture is heated to 35° C. and 0.30 g of a4% solution of VA-044 is added. The resulting solution is sparged with 1000 cc/min. of nitrogen. After 60 minutes, polymerization begins and the solution becomes viscous. After 2 hours, the mixture is a milky dispersion and 0.30 g of a 4% solution of VA-044 is added. After 3.5 hours, 0.30 g of a 4% solution of VA-044 is added. After 5 hours, 1.2 g of a 4% solution of VA-044 is added. After 8 hours, 2.9 g of a 4% solution of VA-044 is added. The reaction is continued for a total of 16 hours at 34–36° C. To the resulting dispersion polymer is added 12 g of sodium sulfate and 8 g of ammonium sulfate. The resulting polymer dispersion has a Brookfield viscosity of 3000 cps, a pH of 7.0, and contains 20% of a 93/7 copolymer of acrylamide/acrylic acid with a reduced specific viscosity of 17.6 dl/gm at 0.045% in 1.0 N NaNO$_3$.

EXAMPLE 27

To a 1.5-liter resin reactor equipped with stirrer, temperature controller, and water cooled condenser is added 441.6 g of deionized water, 126 g of sodium sulfate, 84 g of ammonium sulfate, 0.40 g of sodium formate, 40 g of a 15% solution of a 60/40 w/w copolymer of acrylic acid/Amps (Example 6), 282.12 g of a 49.4% solution of acrylamide (139.36 g), 10.64 g of acrylic acid, 12.50 g of 50% sodium hydroxide, 0.40 g of sodium formate and 0.25 g of EDTA. The mixture is heated to 35° C. and 0.30 g of a 4% solution of VA-044 is added. The resulting solution is sparged with 1000 cc/min. of nitrogen. After 30 minutes, polymerization begins and the solution becomes viscous. After 2 hours, the mixture is a milky dispersion and 0.30 g of a 4% solution of VA-044 is added. After 3 hours 0.30 g of a 4% solution of VA-044 is added. After 4 hours 1.20 g of a 4% solution of VA-044 is added. After 6.5 hours 2.90 g of a 4% solution of VA-044 is added. The reaction is continued for a total of 16 hours at 34–36° C. The resulting polymer dispersion has a Brookfield viscosity of 5000 cps. To the resulting dispersion polymer is added 6 g of sodium sulfate and 4 g of ammonium sulfate. The resulting polymer dispersion has a Brookfield viscosity of 1062.5 cps, a pH of 7.0, and contains 15% of a 93/7 copolymer of acrylamide/acrylic acid with a reduced specific viscosity of 20.5 dl/gm at 0.045% in 1.0 N NaNO$_3$.

EXAMPLE 28

To a 1.5-liter resin reactor equipped with stirrer, temperature controller, and water cooled condenser is added 360.9 g of deionized water, 114 g of sodium sulfate, 76 g of ammonium sulfate, 0.53 g of sodium formate, 40 g of a 15% solution of a 60/40 w/w copolymer of acrylic acid/AMPS (Example 6), 376.15 g of a 49.4% solution of acrylamide (185.82 g), 14.18 g of acrylic acid, 15.45 g of 50% sodium hydroxide and 0.33 g of EDTA. The mixture is heated to 35° C. and 0.30 g of a 2% solution of VA-044 is added. The resulting solution is sparged with 1000 cc/min. of nitrogen. After 60 minutes, polymerization begins and the solution becomes viscous. After 3 hours, the mixture is a milky dispersion and 0.60 g of a 2% solution of VA-044 is added. After 4.5 hours, 1.2 g of a 2% solution of VA-044 is added. After 6.5 hours, 2.9 g of a 2% solution of VA-044 is added. The reaction is continued for a total of 16 hours at 34–36° C. To the resulting dispersion polymer is added 12 g of sodium sulfate and 8 g of ammonium sulfate. The resulting polymer dispersion has a Brookfield viscosity of 1250 cps, a pH of 7.0, and contains 20% of a 93/7 copolymer of acrylamide/acrylic acid with a reduced specific viscosity of 18.3 dl/gm at 0.045% in 1.0 N NaNO$_3$.

EXAMPLE 29

To a 1.5-liter resin reactor equipped with stirrer, temperature controller, and water cooled of condenser is added 430.39 g of deionized water, 120 g sodium sulfate, 80 g of ammonium sulfate, 0.80 g of sodium formate, 60 g of a 10% solution of a 40/60 w/w copolymer of acrylic acid/AMPS (Example 7), 282.12 g of a 49.4% solution of acrylamide (139.36 g), 10.64 g of acrylic acid, 11.2 g of 50% sodium hydroxide and 0.25 g of EDTA. The mixture is heated to 35° C. and 0.30 g of a 4% solution of VA-044 is added. The resulting solution is sparged with 1000 cc/min. of nitrogen. After 30 minutes, polymerization begins and the solution becomes viscous. After 3.25 hours, the mixture is a milky dispersion and 0.30 g of a 4% solution of VA-044 is added. After 4.25 hours, 0.30 g of a 4% solution of VA-044 is added. After 5.25 hours, 1.2 g of a 4% solution of VA-044 is added. After 6.75 hours, 2.9 g of a 4% solution of 2,2'-azobis(N,N'-dimethylene isobutryramidine) dihydrochloride is added. The reaction is continued for a total of 16 hours at 34–36° C. To the resulting dispersion polymer is added 12 g of sodium sulfate and 8 g of ammonium sulfate. The resulting polymer dispersion has a Brookfield viscosity of 1250 cps, a pH of 7.0, and contains 15% of a 93/7 copolymer of acrylamide/acrylic acid with a reduced specific viscosity of 16.0 dl/gm at 0.045% in 1.0 N NaNO$_3$. The dispersion remains stable for 4 days after which time it becomes a gelled mass.

The properties of the dispersion polymers prepared in Examples 18–29 are summarized in Table 2.

TABLE 2

Dispersions of Low Charge Polymers with AA or AA/AMPS Stabilizers

| Example | Dispersion AM/AA mol/mol | Dispersion Concentration | Stabilizer AA/AMPS wt/wt | Brookfield Viscosity cps | RSV @ 0.045% |
|---|---|---|---|---|---|
| 18 | 93/7 | 20 | 100/0 | 1035[a] | 17.4 |
| 20 | 93/7 | 15 | 87/13 | 1200 | 23.1 |
| 19 | 93/7 | 20 | 87/13 | 790[a] | 17.1 |
| 21 | 93/7 | 15 | 97/3 | 1335[a] | 22.2 |
| 22 | 93/7 | 20 | 97/3 | 1275[a] | 18.8 |
| 23 | 93/7 | 15 | 93/7 | 710 | 23.2 |
| 24 | 93/7 | 20 | 93/7 | 2200[a] | 18.8 |
| 25 | 93/7 | 15 | 77/23 | 825 | 21.1 |
| 26 | 93/7 | 20 | 77/23 | 3000[a] | 17.6 |
| 27 | 93/7 | 15 | 60/40 | 1062.5 | 20.5 |
| 28 | 93/7 | 20 | 60/40 | 1250[a] | 18.1 |
| 29 | 93/7 | 15 | 40/60 | 1250[a] | 16.0 |

[a]Dispersion eventually gelled.

METHACRYLIC ACID/2-ACRYLAMIDO-2-METHYL-1-PROPANESULFONIC ACID COPOLYMER STABILIZERS

EXAMPLE 30

To a 1.5-liter resin reactor equipped with stirrer, temperature controller, and water cooled condenser is added 945.59 g of deionized water, 141.96 g of a 58% solution of the sodium salt of 2-acrylamido-2-methyl-1-propanesulfonic acid (AMPS), 126.18 g of 99% methacrylic acid, 114.9 g of a 50% solution of sodium hydroxide (pH=7.0) and 0.20 g of EDTA. The resulting solution is sparged with 1000 cc/min. of nitrogen, heated to 45° C. and 0.50 g of V-50is added. Polymerization begins within 15 minutes and after 60 minutes the solution becomes viscous and the temperature of the reaction rises to 50° C. The reaction is continued for a total of 72 hours at 48–52° C. The resulting polymer solution has a Brookfield viscosity of 61300 cps at 25° C. and contains 15% of a 62.5/37.5 w/w (80/20 M/M) copolymer of methacrylic acid/AMPS with an intrinsic viscosity of 4.26 dl/gm in 1.0 molar NaNO$_3$.

EXAMPLE 31

To a 1.5-liter resin reactor equipped with stirrer, temperature controller, and water cooled condenser is added 960.91 g of deionized water, 66.30 g of a 58% solution of the sodium salt of 2-acrylamido-2-methyl-1-propanesulfonic acid (AMPS), 159.42 g of 99% methacrylic acid, 146.0 g of a 50% solution of sodium hydroxide (pH=7.0) and 0.20 g of EDTA. The resulting solution is sparged with 1000 cc/min. of nitrogen, heated to 45° C. and 0.50 g of V-50is added. Polymerization begins within 15 minutes and after 30 minutes, the solution becomes viscous and the temperature of the reaction rises to 50° C. The reaction is continued for 24 hours at 48–52° C. The reaction mixture is then heated to 80° C. and maintained at 78–82° C. for 24 hours. The resulting polymer solution has a Brookfield viscosity of 24375 cps at 25° C. and contains 15% of a 79/21 w/w (90/10 M/M) copolymer of methacrylic acid/AMPS with an intrinsic viscosity of 3.07 dl/gm in 1.0 molar $NaNO_3$.

EXAMPLE 32

To a 1.5-liter resin reactor equipped with stirrer, temperature controller, and water cooled condenser is added 954.31 g of deionized water, 41.72 g of a 58% solution of the sodium salt of 2-acrylamido-2-methyl-1-propanesulfonic acid (AMPS), 176.12 g of 99% methacrylic acid, 160.48 g of a 50% solution of sodium hydroxide (pH=7.0) and 0.20 g of EDTA. The resulting solution is sparged with 1000 cc/min. of nitrogen, heated to 45° C. and 0.50 g of V-50is added. Polymerization begins within 15 minutes and after 60 minutes, the solution becomes viscous and the temperature of the reaction rises to 50° C. The reaction is continued for 46 hours at 48–52° C. The reaction mixture is then heated to 80° C. and maintained at 78–82° C. for 24 hours. The resulting polymer solution has a Brookfield viscosity of 37000 cps at 25° C. and contains 15% of an 89/11 w/w (95/05 M/M) copolymer of methacrylic acid/AMPS with an intrinsic viscosity of 3.55 dl/gm in 1.0 molar $NaNO_3$.

EXAMPLE 33

To a 1.5-liter resin reactor equipped with stirrer, temperature controller, and water cooled condenser is added 939.21 g of deionized water, 191.92 g of a 58% solution of the sodium salt of 2-acrylamido-2-methyl-1-propanesulfonic acid (AMPS), 99.5 g of 99% methacrylic acid, 92.0 g of a 50% solution of sodium hydroxide (pH=7.0) and 0.20 g of EDTA. The resulting solution is sparged with 1000 cc/min. of nitrogen, heated to 45° C. and 0.50 g of V-50 is added. Polymerization begins within 15 minutes and after 60 minutes, the solution becomes viscous and the temperature of the reaction rises to 50° C. The reaction is continued for 18 hours at 48–52° C. The reaction mixture is then heated to 80° C. and maintained at 78–82° C. for 24 hours. The resulting polymer solution has a Brookfield viscosity of 43200 cps at 25° C. and contains 15% of a 49/51 w/w (70/30 M/M) copolymer of methacrylic acid/AMPS with an intrinsic viscosity of 4.28 dl/gm in 1.0 molar $NaNO_3$.

EXAMPLE 34

To a 1.5-liter resin reactor equipped with stirrer, temperature controller, and water cooled condenser is added 950.75 g of deionized water, 232.87 g of a 58% solution of the sodium salt of 2-acrylamido-2-methyl-1-propanesulfonic acid (AMPS), 77.61 g of 99% methacrylic acid, 71.4 g of a 50% solution of sodium hydroxide (pH=7.0) and 0.20 g of EDTA. The resulting solution is sparged with 1000 cc/min. of nitrogen, heated to 45° C. and 0.50 g of V-50is added. Polymerization begins within 15 minutes and after 60 minutes, the solution becomes viscous and the temperature of the reaction rises to 50° C. The reaction is continued for 19 hours at 48–52° C. The reaction mixture is then heated to 80° C. and maintained at 78–82° C. for 24 hours. The resulting polymer solution has a Brookfield viscosity of 32500 cps at 25° C. and contains 15% of a 38.4/61.6 w/w (60/40 M/M) copolymer of methacrylic acid/AMPS with an intrinsic viscosity of 3.59 dl/gm in 1.0 molar $NaNO_3$.

EXAMPLE 35

To a 1.5-liter resin reactor equipped with stirrer, temperature controller, and water cooled condenser is added 951.99 g of deionized water, 267.07 g of a 58% solution of the sodium salt of 2-acrylamido-2-methyl-1-propanesulfonic acid (AMPS), 59.34 g of 99% methacrylic acid, 54.23 g of a 50% solution of sodium hydroxide (pH=7.0) and 0.20 g of EDTA. The resulting solution is sparged with 1000 cc/min. of nitrogen, heated to 45° C. and 0.50 g of V-50 is added. Polymerization begins within 15 minutes and after 60 minutes, the solution becomes viscous and the temperature of the reaction rises to 55° C. The reaction is continued for 8 hours at 48–52° C. The reaction mixture is then heated to 80° C. and maintained at 78–82° C. for 24 hours. The resulting polymer solution has a Brookfield viscosity of 31750 at 25° C. and contains 15% of a 29.4/70.6 w/w (50/50 M/M) copolymer of methacrylic acid/AMPS with an intrinsic viscosity of 3.63 dl/gm in 1.0 molar $NaNO_3$.

EXAMPLE 36

To a 1.5-liter resin reactor equipped with stirrer, temperature controller, and water cooled condenser is added 951.77 g of deionized water, 267.07 g of a 58% solution of the sodium salt of 2-acrylamido-2-methyl-1-propanesulfonic acid (AMPS), 59.34 g of 99% methacrylic acid, 54.45 g of a 50% solution of sodium hydroxide (pH=7.0) and 0.20 g of EDTA. The resulting solution is sparged with 1000 cc/min. of nitrogen, heated to 45° C. and 0.50 g of V-50 is added. Polymerization begins within 15 minutes and after 60 minutes, the solution becomes viscous and the temperature of the reaction rises to 55° C. The reaction is continued for 26 hours at 53–57° C. The resulting polymer solution has a Brookfield viscosity of 15100 at 25° C. and contains 15% of a 29.4/70.6 w/w (50/50 M/M) copolymer of methacrylic acid/AMPS with an intrinsic viscosity of 3.10 dl/gm in 1.0 molar $NaNO_3$.

EXAMPLE 37

To a 1.5-liter resin reactor equipped with stirrer, temperature controller, and water cooled condenser is added 952.82 g of deionized water, 296.06 g of a 58% solution of the sodium salt of 2-acrylamido-2-methyl-1-propanesulfonic acid (AMPS), 43.85 g of 99% methacrylic acid, 39.90 g of a 50% solution of sodium hydroxide (pH=7.0) and 0.20 g of EDTA. The resulting solution is sparged with 1000 cc/min. of nitrogen, heated to 45° C. and 0.50 g of V-50is added. Polymerization begins within 15 minutes and after 60 minutes, the solution becomes viscous and the temperature of the reaction rises to 55° C. The reaction is continued for 26 hours at 53–57° C. The resulting polymer solution has a Brookfield viscosity of 9420 at 25° C. and contains 15% of a 21.7/78.3 w/w (40/60 M/M) copolymer of methacrylic acid/AMPS with an intrinsic viscosity of 2.88 dl/gm in 1.0 molar $NaNO_3$.

EXAMPLE 38

To a 1.5-liter resin reactor equipped with stirrer, temperature controller, and water cooled condenser is added 953.05 g of deionized water, 320.94 g of a 58% solution of the sodium salt of 2-acrylamido-2-methyl-1-propanesulfonic acid (AMPS), 30.56 g of 99% methacrylic acid, 28.18 g of a 50% solution of sodium hydroxide (pH=7.0) and 0.20 g of EDTA. The resulting solution is sparged with 1000 cc/min. of nitrogen, heated to 45° C. and 0.50 g of V-50 is added. Polymerization begins within 15 minutes and after 60 minutes, the solution becomes viscous and the temperature of the reaction rises to 55° C. The reaction is continued for 26 hours, during which time the temperature is maintained at 53–57° C. The resulting polymer solution has a Brookfield viscosity of 6470 at 25° C. and contains 15% of a 15.3/84.7 w/w (30/70 M/M) copolymer of methacrylic acid/AMPS with an intrinsic viscosity of 2.54 dl/gm in 1.0 molar NaNO$_3$.

EXAMPLE 39

To a 1.5-liter resin reactor equipped with stirrer, temperature controller, and water cooled condenser is added 953.67 g of deionized water, 342.53 g of a 58% solution of the sodium salt of 2-acrylamido-2-methyl-1-propanesulfonic acid (AMPS), 19.03 g of 99% methacrylic acid, 17.40 g of a 50% solution of sodium hydroxide (pH=7.0) and 0.20 g of EDTA. The resulting solution is sparged with 1000 cc/min. of nitrogen, heated to 45° C. and 0.50 g of V-50 is added. Polymerization begins within 15 minutes and after 45 minutes, the solution becomes viscous and the temperature of the reaction rises to 58° C. The reaction is continued for 6 hours at 53–57° C. The reaction mixture is then heated to 80° C. and maintained at 78–82° C. for 20 hours. The resulting polymer solution has a Brookfield viscosity of 8150 at 25° C. and contains 15% of a 9.4/90.6 w/w (20/80 M/M) copolymer of methacrylic acid/AMPS with an intrinsic viscosity of 2.53 dl/gm in 1.0 molar NaNO$_3$.

EXAMPLE 40

To a 1.5-liter resin reactor equipped with stirrer, temperature controller, and water cooled condenser is added 954.06 g of deionized water, 361.44 g of a 58% solution of the sodium salt of 2-acrylamido-2-methyl-1-propanesulfonic acid (AMPS), 8.92 g of 99% methacrylic acid, 8.20 g of a 50% solution of sodium hydroxide (pH=7.0) and 0.20 g of EDTA. The resulting solution is sparged with 1000 cc/min of nitrogen, heated to 45° C. and 0.50 g of V-50 is added. Polymerization begins within 15 minutes and after 60 minutes, the solution becomes viscous and the temperature of the reaction rises to 55° C. The reaction is continued for 37 hours at 51–57° C. The resulting polymer solution has a Brookfield viscosity of 41000 at 25° C. and contains 15% of a 4.5/95.5 w/w (10/90 M/M) copolymer of methacrylic acid/AMPS with an intrinsic viscosity of 2.38 dl/gm in 1.0 molar NaNO$_3$.

EXAMPLE 41

To a 1.5-liter resin reactor equipped with stirrer, temperature controller, and water cooled condenser is added 1799.3 g of deionized water, 200.00 g of methacrylic acid, (pH-= 3.0) and 0.20 g of EDTA. The resulting solution is sparged with 1000 cc/min. of nitrogen, heated to 70° C. and 0.50 g of azobis(N,N'2-amidinopropane) dihydrochloride is added. Polymerization begins within 10 minutes, the solution becomes viscous and the temperature of the reaction rises to 79° C. The reaction is continued for a total of 24 at 79–84° C. The resulting polymer solution (4418–017) has a Brookfield viscosity greater than 2 million cps at 25° C. and contains 10% of a 100% homopolymer of methacrylic acid with an intrinsic viscosity of 2.45 dl/gm in 1.0 molar NaNO3 at a pH of 7.0.

The properties of the MAA/AMPS stabilizers prepared in Examples 30–41 are summarized in Table 3.

TABLE 3

MAA/AMPS Copolymer Stabilizers

| Example | Polymer MAA/AMPS wt/wt | Polymer MAA/AMPS mol/mol | RSV @1.0% dl/gm | IV dl/gm | VISC cp. |
|---|---|---|---|---|---|
| 30 | 62.5/37.5 | 80/20 | 8.20 | 4.26 | 61300 |
| 31 | 79/21 | 90/10 | 5.45 | 3.07 | 24375 |
| 32 | 89/11 | 95/05 | 6.88 | 3.55 | 37000 |
| 33 | 49/51 | 70/30 | 9.09 | 4.28 | 43200 |
| 34 | 38.4/61.6 | 60/40 | 6.81 | 3.59 | 32500 |
| 35 | 29.4/70.6 | 50/50 | 6.96 | 3.63 | 31750 |
| 36 | 29.4/70.6 | 50/50 | 5.06 | 3.10 | 15100 |
| 37 | 21.7/78.3 | 40/60 | 4.27 | 2.88 | 9420 |
| 38 | 15.3/84.7 | 30/70 | 3.83 | 2.54 | 6470 |
| 39 | 9.4/90.6 | 20/80 | 3.92 | 2.53 | 8150 |
| 40 | 4.5/95.5 | 10/90 | 3.62 | 2.38 | 41000 |
| 41 | 100/0 |  |  | 2.45 | >2,000,000 |

DISPERSION POLYMERS WITH MAA/AMPS STABILIZERS

EXAMPLE 42

To a 1.5-liter resin reactor equipped with stirrer, temperature controller, and water cooled condenser is added 443.42 g of deionized water, 126 g of sodium sulfate, 84 g of ammonium sulfate, 0.40 of sodium formate, 40 g of a 15% solution of a 62.5/37.5 w/w copolymer of methacrylic acid/AMPS (Example 30), 280.99 g of a 49.6% solution of acrylamide (139.36 g), 10.64 g of acrylic acid, 11.8 g of 50% sodium hydroxide and 0.25 g of EDTA. The mixture is heated to 35° C. and 0.30 g of a 1% solution of VA-044 is added. The resulting solution is sparged with 1000 cc/min. of nitrogen. After 30 minutes, polymerization begins and the solution becomes viscous. After 2 hours, the mixture is a milky dispersion and 0.30 g of a 1% solution of VA-044 is added. After 4 hours, 0.30 g of a 1% solution of VA-044 is added. After 5 hours, 1.2 g of a 1% solution of VA-044 is added. After 6 hours, 2.9 g of a 1% solution of VA-044 is added. After 7 hours 5.0 g of a 1% solution of VA-044 is added. The reaction is continued for a total of 16 hours at 34–36° C. To the resulting dispersion polymer is added 6 g of sodium sulfate and 4 g of ammonium sulfate. The resulting polymer dispersion has a Brookfield viscosity of 825 cps, a pH of 7.0, and contains 15% of a 93/7 copolymer of acrylamide/acrylic acid with a reduced specific viscosity of 22.9 dl/gm at 0.045% in 1.0 N NaNO$_3$.

EXAMPLE 43

To a 1.5-liter resin reactor equipped with stirrer, temperature controller, and water cooled condenser is added 362.0 g of deionized water, 114 g of sodium sulfate, 76 g of ammonium sulfate, 0.53 g of sodium formate, 40 g of a 15% solution of a 62.5/37.5 w/w copolymer of methacrylic acid/AMPS (Example 20), 374.8 g of a 49.6% solution of acrylamide (185.82 g), 14.18 g of acrylic acid, 13.66 g of 50% sodium hydroxide and 0.33 g of EDTA. The mixture is heated to 35° C. and 0.30 g of a 1% solution of VA-044 is added. The resulting solution is sparged with 1000 cc/min. of nitrogen. After 60 minutes, polymerization begins and the solution becomes viscous. After 4.5 hours, the mixture is a milky dispersion and 0.30 g of a 1% solution of VA-044 is added. After 5.5 hours, 0.30 g of a 1% solution of VA-044 is added. After 6.5 hours, 1.2 g of a 1% solution of VA-044 is added. After 8.0 hours, 2.9 g of a 1% solution of VA-044 is added. The reaction is continued for a total of 16 hours at 34–36° C. To the resulting dispersion polymer is added 12 g of sodium sulfate and 8 g of ammonium sulfate. The resulting polymer dispersion has a Brookfield viscosity of 2130 cps, a pH of 7.0, and contains 20% of a 93/7 copolymer of acrylamide/acrylic acid with a reduced specific viscosity of 22.8 dl/gm at 0.045% in 1.0 N NaNO$_3$.

EXAMPLE 44

To a 1.5-liter resin reactor equipped with stirrer, temperature controller, and water cooled condenser is added 443.67 g of deionized water, 126 g of sodium sulfate, 84 g of ammonium sulfate, 0.40 g of sodium formate, 40 g of a 15% solution of a 79/21 w/w copolymer of methacrylic acid/AMPS (Example 23), 280.99 g of a 49.6% solution of acrylamide (139.36 g), 10.64 g of acrylic acid, 11.55 g of 50% sodium hydroxide and 0.25 g of EDTA. The mixture is heated to 35° C. and 0.30 g of a 1% solution of VA-044 is added. The resulting solution is sparged with 1000 cc/min. of nitrogen. After 60 minutes, polymerization begins and the solution becomes viscous. After 2 hours, the mixture is a milky dispersion and 0.30 g of a 1% solution of VA-044 is added. After 3.5 hours, 0.30 g of a 1% solution of VA-044 is added. After 4.5 hours, 1.2 g of a 1% solution of VA-044 is added. After 5.5 hours, 2.9 g of a 1% solution of VA-044 is added. After 8 hours 5.0 g of a 1% solution of VA-044 is added. The reaction is continued for a total of 16 hours, during which time the temperature is maintained at 34–36° C. To the resulting dispersion polymer is added 6 g of sodium sulfate and 4 g of ammonium sulfate. The resulting polymer dispersion has a Brookfield viscosity of 680 cps, a pH of 7.0, and contains 15% of a 93/7 copolymer of acrylamide/acrylic acid with a reduced specific viscosity of 24.2 dl/gm at 0.045% in 1.0 N NaNO$_3$.

EXAMPLE 45

To a 1.5-liter resin reactor equipped with stirrer, temperature controller, and water cooled condenser is added 362.21 g of deionized water, 114 g of sodium sulfate, 76 g of ammonium sulfate, 0.53 g of sodium formate, 40 g of a 15% solution of a 79/21 w/w copolymer of methacrylic acid/AMPS (Example 23), 374.8 g of a 49.6% solution of acrylamide (185.82 g), 14.18 g of acrylic acid, 15.45 g of 50% sodium hydroxide and 0.33 g of EDTA. The mixture is heated to 35° C. and 0.30 g of a 1% solution of VA-044 is added. The resulting solution is sparged with 1000 cc/min. of nitrogen. After 60 minutes, polymerization begins and the solution becomes viscous. After 2.5 hours, the mixture is a milky dispersion and 0.30 g of a 1% solution of VA-044 is added. After 3.5 hours, 0.30 g of a 1% solution of VA-044 is added. After 4.5 hours, 1.2 g of a 1% solution of VA-044 is added. After 5.5 hours, 2.9 g of a 1% solution of VA-044 is added. After 7 hours, 5.0 g of a 1% solution of VA-044 is added. The reaction is continued for a total of 16 hours, during which time the temperature is maintained at 34–36° C. To the resulting dispersion polymer is added 12 g of sodium sulfate and 8 g of ammonium sulfate. The resulting polymer dispersion has a Brookfield viscosity of 2200 cps, a pH of 7.0, and contains 20% of a 93/7 copolymer of acrylamide/acrylic acid with a reduced specific viscosity of 18.5 dl/gm at 0.045% in 1.0 N NaNO$_3$.

EXAMPLE 46

To a 1.5-liter resin reactor equipped with stirrer, temperature controller, and water cooled condenser is added 443.78 g of deionized water, 126 g of sodium sulfate, 84 g of ammonium sulfate, 0.40 g of sodium formate, 40 g of a 15% solution of a 89/11 w/w copolymer of methacrylic acid/AMPS (Example 26), 280.99 g of a 49.6% solution of acrylamide (139.36 g), 10.64 g of acrylic acid, 11.45 g of 50% sodium hydroxide and 0.25 g of EDTA. The mixture is heated to 35° C. and 0.30 g of a 1% solution of VA-044 is added. The resulting solution is sparged with 1000 cc/min. of nitrogen. After 60 minutes, polymerization begins and the solution becomes viscous. After 2 hours, the mixture is a milky dispersion and 0.30 g of a 1% solution of VA-044 is added. After 3.5 hours, 0.30 g of a 1% solution of VA-044 is added. After 4.5 hours, 1.2 g of a 1% solution of VA-044 is added. After 5.5 hours, 2.9 g of a 1% solution of VA-044 is added. After 7 hours, 5.0 g of a 1% solution of VA-044 is added. The reaction is continued for a total of 16 hours at 34–36° C. To the resulting dispersion polymer is added 6 g of sodium sulfate and 4 g of ammonium sulfate. The resulting polymer dispersion has a Brookfield viscosity of 810 cps, a pH of 7.0, and contains 15% of a 93/7 copolymer of acrylamide/acrylic acid with a reduced specific viscosity of 23.4 dl/gm at 0.045% in 1.0 N NaNO$_3$.

EXAMPLE 47

To a 1.5-liter resin reactor equipped with stirrer, temperature controller, and water cooled condenser is added 443.81 g of deionized water, 126 g of sodium sulfate, 84 g of ammonium sulfate, 0.40 g of sodium formate, 40 g of a 15% solution of a 49/51 w/w copolymer of methacrylic acid/AMPS (Example 28), 280.99 g of a 49.6% solution of acrylamide (139.36 g), 10.64 g of acrylic acid, 11.53 g of 50% sodium hydroxide, and 0.25 g of EDTA. The mixture is heated to 35° C. and 0.30 g of a 1% solution of VA-044 is added. The resulting solution is sparged with 1000 cc/min. of nitrogen. After 60 minutes, polymerization begins and the solution becomes viscous. After 2 hours, the mixture is a milky dispersion and 0.30 g of a 1% solution of VA-044 is added. After 3.5 hours, 0.30 g of a 1% solution of VA-044 is added. After 5 hours, 1.2 g of a 1% solution of VA-044 is added. After 6.5 hours, 2.9 g of a 1% solution of VA-044 is added. After 8 hours, 5.0 g of a 1% solution of VA-044 is added. The reaction is continued for a total of 16 hours at 34–36° C. To the resulting dispersion polymer is added 6 g of sodium sulfate and 4 g of ammonium sulfate. The resulting polymer dispersion has a Brookfield viscosity of 745 cps, a pH of 7.0, and contains 15% of a 93/7 copolymer of acrylamide/acrylic acid with a reduced specific viscosity of 23.4 dl/gm at 0.045% in 1.0 N NaNO$_3$.

EXAMPLE 48

To a 1.5-liter resin reactor equipped with stirrer, temperature controller, and water cooled condenser is added 362.21 g of deionized water, 114 g of sodium sulfate, 76 g of ammonium sulfate, 0.53 g of sodium formate, 40 g of a 15% solution of a 49/51 w/w copolymer of methacrylic acid/AMPS (Example 28), 374.8 g of a 49.6% solution of acrylamide (185.82 g), 14.18 g of acrylic acid, 15.45 g of 50% sodium hydroxide and 0.33 g of EDTA. The mixture is heated to 35° C. and 0.30 g of a 1% solution of VA-044 is added. The resulting solution is sparged with 1000 cc/min. of nitrogen. After 60 minutes, polymerization begins and the solution becomes viscous. After 2 hours, the mixture is a milky dispersion and 0.30 g of a 1% solution of VA-044 is added. After 3.5 hours, 0.30 g of a 1% solution of VA-044 is added. After 4.5 hours, 1.2 g of a 1% solution of VA-044 is added. After 7 hours, 2.9 g of a 1% solution of VA-044 is added. The reaction is continued for a total of 16 hours at 34–36° C. To the resulting dispersion polymer is added 12 g of sodium sulfate and 8 g of ammonium sulfate. The resulting polymer dispersion has a Brookfield viscosity of 2260 cps, a pH of 7.0, and contains 20% of a 93/7 copolymer of acrylamide/acrylic acid with a reduced specific viscosity of 21.9 dl/gm at 0.045% in 1.0 N $NaNO_3$.

EXAMPLE 49

To a 1.5-liter resin reactor equipped with stirrer, temperature controller, and water cooled condenser is added 362.26 g of deionized water, 114 g of sodium sulfate, 76 g of ammonium sulfate, 0.53 g of sodium formate, 40 g of a 15% solution of a 38.4/61.6 w/w copolymer of methacrylic acid/AMPS (Example 31), 374.8 g of a 49.6% solution of acrylamide (185.82 g), 14.18 g of acrylic acid, 15.40 g of 50% sodium hydroxide and 0.33 g of EDTA. The mixture is heated to 35° C. and 0.30 g of a 1% solution of VA-044 is added. The resulting solution is sparged with 1000 cc/min. of nitrogen. After 60 minutes, polymerization begins and the solution becomes viscous. After 3 hours, the mixture is a milky dispersion and 0.30 g of a 1% solution of VA-044 is added. After 5 hours 0.30 g of a 1% solution of VA-044 is added. After 6.5 hours, 1.2 g of a 1% solution of VA-044 is added. After 8 hours, 2.9 g of a 1% solution of VA-044 is added. The reaction is continued for a total of 16 hours at 34–36° C. To the resulting dispersion polymer is added 12 g of sodium sulfate and 8 g of ammonium sulfate. The resulting polymer dispersion has a Brookfield viscosity of 1630 cps, a pH of 7.0, and contains 20% of a 93/7 copolymer of acrylamide/acrylic acid with a reduced specific viscosity of 22.3 dl/gm at 0.045% in 1.0 N $NaNO_3$.

EXAMPLE 50

To a 1.5-liter resin reactor equipped with stirrer, temperature controller, and water cooled condenser is added 443.69 g of deionized water, 126 g of sodium sulfate, 84 g of ammonium sulfate, 0.40 g of sodium formate, 40 g of a 15% solution of a 38.4/61.6 w/w copolymer of methacrylic acid/AMPS (Example 31), 280.99 g of a 49.6% solution of acrylamidc (139.36 g), 10.64 g of acrylic acid, 11.53 g of 50% sodium hydroxide and 0.25 g of EDTA. The mixture is heated to 35° C. and 0.30 g of a 1% solution of VA-044 is added. The resulting solution is sparged with 1000 cc/min. of nitrogen. After 60 minutes, polymerization begins and the solution becomes viscous. After 2 hours, the mixture is a milky dispersion and 0.30 g of a 1% solution of VA-044 is added. After 3.5 hours, 0.30 g of a 1% solution of VA-044 is added. After 5 hours, 1.2 g of a 1% solution of VA-044 is added. After 6.5 hours, 2.9 g of a 1% solution of VA-044 is added. After 8 hours, 5.0 g of a 1% solution of VA-044 is added. The reaction is continued for a total of 16 hours at 34–36° C. To the resulting dispersion polymer is added 6 g of sodium sulfate and 4 g of ammonium sulfate. The resulting polymer dispersion has a Brookfield viscosity of 900 cps, a pH of 7.0, and contains 15% of a 93/7 copolymer of acrylamide/acrylic acid with a reduced specific viscosity of 22.3 dl/gm at 0.045% in 1.0 N $NaNO_3$.

EXAMPLE 51

To a 1.5-liter resin reactor equipped with stirrer, temperature controller, and water cooled condenser is added 362.46 g of deionized water, 114 g of sodium sulfate, 76 g of ammonium sulfate, 0.53 g of sodium formate, 40 g of a 15% solution of a 29.4/71.6 w/w copolymer of methacrylic acid/AMPS (Example 34), 374.8 g of a 49.6% solution of acrylamide (185.82 g), 14.18 g of acrylic acid, 15.20 g of 50% sodium hydroxide and 0.33 g of EDTA. The mixture is heated to 35° C. and 0.30 g of a 1% solution of VA-044 is added. The resulting solution is sparged with 1000 cc/min. of nitrogen. After 60 minutes, polymerization begins and the solution becomes viscous. After 2.5 hours, the mixture is a milky dispersion and 0.30 g of a 1% solution of VA-044 is added. After 4 hours, 0.30 g of a 1% solution of VA-044 is added. After 5.5 hours, 1.2 g of a 1% solution of VA-044 is added. After 8 hours, 2.9 g of a 1% solution of VA-044 is added. The reaction is continued for a total of 16 hours at 34–36° C. To the resulting dispersion polymer is added 12 g of sodium sulfate and 8 g of ammonium sulfate. The resulting polymer dispersion has a Brookfield viscosity of 650 cps, a pH of 7.0, and contains 20% of a 93/7 copolymer of acrylamide/acrylic acid with a reduced specific viscosity of 17.5 dl/gm at 0.045% in 1.0 N $NaNO_3$.

EXAMPLE 52

To a 1.5-liter resin reactor equipped with stirrer, temperature controller, and water cooled condenser is added 443.69 g of deionized water, 126 g of sodium sulfate, 84 g of ammonium sulfate, 0.40 g of sodium formate, 40 g of a 15% solution of a 29.4/71.6 w/w copolymer of methacrylic acid/AMPS (Example 34), 280.99 g of a 49.6% solution of acrylamide (139.36 g), 10.64 g of acrylic acid, 11.35 g of 50% sodium hydroxide and 0.25 g of EDTA. The mixture is heated to 35° C. and 0.30 g of a 1% solution of VA-044 is added. The resulting solution is sparged with 1000 cc/min. of nitrogen. After 60 minutes, polymerization begins and the solution becomes viscous. After 2.25 hours, the mixture is a milky dispersion and 0.30 g of a 1% solution of VA-044 is added. After 4 hours, 0.30 g of a 1% solution of VA-044 is added. After 5 hours, 1.2 g of a 1% solution of VA-044 is added. After 7.5 hours, 2.9 g of a 1% solution of VA-044 is added. The reaction is continued for a total of 16 hours at 34–36° C. To the resulting dispersion polymer is added 6 g of sodium sulfate and 4 g of ammonium sulfate. The resulting polymer dispersion has a Brookfield viscosity of 980 cps, a pH of 7.0, and contains 15% of a 93/7 copolymer of acrylamide/acrylic acid with a reduced specific viscosity of 18.3 dl/gm at 0.045% in 1.0 N $NaNO_3$.

The properties of the polymer dispersions prepared in Examples 42–52 are listed in Table 4.

TABLE 4

Dispersion Polymers with MAA/AMPS Stabilizers

| Example | Dispersion AM/AA mol/mol | Dispersion Concentration | Stabilizer MAA/AMPS wt/wt | Brookfield Viscosity cps | RSV @ 0.045% |
|---|---|---|---|---|---|
| 42 | 93/7 | 15 | 62.5/37.5 | 825[a] | 22.9 |
| 43 | 93/7 | 20 | 62.5/37.5 | 2130[a] | 22.8 |
| 44 | 93/7 | 15 | 79/21 | 680[a] | 24.2 |
| 45 | 93/7 | 20 | 79/21 | 2200[a] | 18.5 |
| 46 | 93/7 | 15 | 89/11 | 810[a] | 23.4 |
| 47 | 93/7 | 15 | 49/51 | 745 | 23.4 |
| 48 | 93/7 | 20 | 49/51 | 2260[a] | 21.9 |
| 49 | 93/7 | 20 | 38.4/61.6 | 1630[a] | 22.3 |
| 50 | 93/7 | 15 | 38.4/61.6 | 900 | 22.3 |
| 51 | 93/7 | 20 | 29.4/70.6 | 650 | 17.5 |
| 52 | 93/7 | 15 | 29.4/70.6 | 980 | 18.3 |

[a]Dispersion eventually gelled.

NONIONIC DISPERSION POLYMERS WITH AA/AMPS STABILIZERS

EXAMPLE 53

To a 1.5-liter resin reactor equipped with stirrrer, temperature controller and water cooled condenser is added 439.52 g of deionized water, 120 g of sodium sulfate, 80 g of ammonium sulfate, 0.33 g of a 50% solution of sodium hydroxide, 50 g of a 12% solution of an 80/20 mole/mole Amps/acrylic acid copolymer (IV=5.17 dl/gm), 306.75 g of a 48.9% solution of acrylamide (150 g), 0.60 g of sodium formate and 0.25 g of EDTA. The mixture is heated to 35° C. and 0.30 g of a 2% solution of VA-044 is added. The resulting solution is sparged with 1000 cc/min. of nitrogen. After 60 minutes, polymerization begins and the solution becomes viscous. After 1.5 hours, the mixture becomes a milky dispersion. After 2 hours, a second 0.30 g of a 2% solution of VA-044 is added. After 3 hours, a third 0.30 g of a 2% solution of VA-044 is added. After 4 hours, 1.2 g of a 2% solution of VA-044 is added. After 7 hours, 2.90 g of a 2% solution of VA-044 is added. The reaction is continued for a total of 24 hours at 34–36° C. The resulting polymer dispersion has a Brookfield viscosity of 287.5 cps, a pH of 6.0, and contains 15% of a homopolymer of acrylamide with an intrinsic viscosity of 12.9 dl/gm in 1.0 molar $NaNO_3$.

EXAMPLE 54

To a 1.5-liter resin reactor equipped with strirrer, temperature controller and water cooled condenser is added 427.85 g of deionized water, 120 g of sodium sulfate, 80 g of ammonium sulfate, 2.05 g of a 50% solution of sodium hydroxide, 60 g of a 10% solution of a 34/66 mole/mole Amps/acrylic acid copolymer (IV=2.79 dl/gm), 306.75 g of a 48.9% solution of acrylamide (150 g), 0.60 g of sodium formate and 0.25 g of EDTA. The mixture is heated to 35° C. and 0.30 g of a 2% solution of VA-044 is added. The resulting solution is sparged with 1000 cc/min. of nitrogen. After 60 minutes, polymerization begins and the solution becomes viscous. After 2 hours, the mixture becomes a milky dispersion and a second 0.30 g of a 2% solution of VA-044 is added. After 3 hours, a third 0.30 g of a 2% solution of VA-044 is added. After 4 hours, 1.2 g of a 2% solution of VA-044 is added. After 7 hours, 2.90 g of a 2% solution of VA-044 is added. The reaction is continued for a total of 24 hours at 34–36° C. The resulting polymer dispersion has a Brookfield viscosity of 160 cps, a pH of 6.0, and contains 15% of a homopolymer of acrylamide with an intrinsic viscosity of 14.2 dl/gm in 1.0 molar $NaNO_3$.

EXAMPLE 55

To a 1.5-liter resin reactor equipped with strirrer, temperature controller and water cooled condenser is added 436.65 g of deionized water, 120 g of sodium sulfate, 80 g of ammonium sulfate, 3.25 g of a 50% solution of sodium hydroxide, 50 g of a 12% solution of a 20/80 mole/mole Amps/acrylic acid copolymer (IV=2.02 dl/gm), 306.75 g of a 48.9% solution of acrylamide (150 g), 0.60 g of sodium formate and 0.25 g of EDTA. The mixture is heated to 35° C. and 0.30 g of a 2% solution of VA-044 is added. The resulting solution is sparged with 1000 cc/min. of nitrogen. After 60 minutes, polymerization begins and the solution becomes viscous. After 2 hours, the mixture is a milky dispersion and 0.30 g of a 2% solution of VA-044 is added. After 3 hours, 0.30 g of a 2% solution of VA-044 is added. After 4.5 hours, 1.2 g of a 2% solution of VA-044 is added. After 7 hours 2.90 g of a 2% solution of VA-044 is added. The reaction is continued for a total of 24 hours at 34–36° C. The resulting polymer dispersion has a Brookfield viscosity of 140 cps, a pH of 6.0, and contains 15% of a homopolymer of acrylamide with an intrinsic viscosity of 13.5 dl/gm in 1.0 molar $NaNO_3$.

EXAMPLE 56

To a 1.5-liter resin reactor equipped with strirrer, perature controller and water cooled condenser is added 425.57 g of deionized water, 120 g of sodium sulfate, 80 g of ammonium sulfate, 4.33 g of a 50% solution of sodium hydroxide, 60 g of a 10% solution of a 9.3/90.7 mole/mole Amps/acrylic acid copolymer (IV=3.36 dl/gm), 306.75 g of a 48.9% solution of acrylamide (150 g), 0.60 g of sodium formate and 0.25 g of EDTA. The mixture is heated to 35° C. and 0.30 g of a 2% solution of VA-044 is added. The resulting solution is sparged with 1000 cc/min. of nitrogen. After 60 minutes, polymerization begins and the solution becomes viscous. After 2 hours, the mixture is a milky dispersion and 0.30 g of a 2% solution of VA-044 is added. After 3 hours, 0.30 g of a 2% solution of VA-044 is added. After 4 hours, 1.2 g of a 2% solution of VA-044 is added. After 7 hours, 2.90 g of a 2% solution of VA-044 is added. The reaction is continued for a total of 24 hours at 34–36° C. The resulting polymer dispersion has a Brookfield viscosity of 270 cps, a pH of 6.0, and contains 15% of a homopolymer of acrylamide with an intrinsic viscosity of 13.8 dl/gm in 1.0 molar $NaNO_3$.

EXAMPLE 57

To a 1.5-liter resin reactor equipped with strirrer, temperature controller and water cooled condenser is added 424.35 g of deionized water, 120 g of sodium sulfate, 80 g of ammonium sulfate, 5.25 g of a 50% solution of sodium hydroxide, 60 g of a 10% solution (Example 17) of an acrylic acid homopolymer (IV=3.72 dl/gm), 306.75 g of a 48.9% solution of acrylamide (150 g), 0.60 g of sodium formate and 0.25 g of EDTA. The mixture is heated to 35° C. and 0.30 g of a 2% solution of VA-044 is added. The resulting solution is sparged with 1000 cc/min. of nitrogen. After 60 minutes, polymerization begins and the solution becomes viscous. After 2 hours, the mixture is a milky dispersion to which is added 0.30 g of a 2% solution of 2,2'azobis(N,N'-dimethylene isobutryramidine) dihydrochloride. After 3 hours, 0.30 g of a 2% solution of VA-044 is added. After 4 hours, 1.2 g of a 2% solution of VA-044 is added. After 7 hours, 2.90 g of a 2% solution of VA-044 is added. The reaction is continued for a total of 24 hours at 34–36° C. The resulting polymer dispersion has a Brookfield viscosity of 562.5 cps, a pH of 6.0, and contains 15% of a homopolymer of acrylamide with an intrinsic viscosity of 15.5 dl/gm in 1.0 molar $NaNO_3$.

EXAMPLE 58

To a 1.5-liter resin reactor equipped with strirrer, temperature controller and water cooled condenser is added 425.25 g of deionized water, 120 g of sodium sulfate, 80 g of ammonium sulfate, 6.66 g of a 50% solution of sodium hydroxide, 60 g of a 10% solution (Example 18) of a methacrylic acid homopolymer (IV=2.45 dl/gm), 306.75 g of a 48.9% solution of acrylamide (150 g), 0.60 g of sodium formate and 0.25 g of EDTA. The mixture is heated to 35° C. and 0.30 g of a 2% solution of VA-044 is added. The resulting solution is sparged with 1000 cc/min. of nitrogen. After 60 minutes, polymerization begins and the solution becomes viscous. After 2 hours, the mixture is a milky dispersion to which 0.30 g of a 2% solution of VA-044 is added. After 3 hours, a third 0.30 g of a 2% solution of VA-044 is added. After 4.5 hours, 1.2 g of a 2% solution of VA-044 is added. After 7 hours, 2.90 g of a 2% solution of VA-044 is added. The reaction is continued for a total of 24 hours at 34–36° C. The resulting polymer dispersion has a Brookfield viscosity of 820 cps, a pH of 6.0, and contains 15% of a homopolymer of acrylamide with an intrinsic viscosity of 13.4 dl/gm in 1.0 molar $NaNO_3$.

EXAMPLE 59

To a 1.5-liter resin reactor equipped with strirrer, temperature controller and water cooled condenser is added 435.15 g of deionized water, 120 g of sodium sulfate, 80 g of ammonium sulfate, 4.75 g of a 50% solution of sodium hydroxide, 50 g of a 12% solution (Example 19) of a 90/10 mole/mole Acrylic acid/acrylamide copolymer (IV=3.59 dl/gm), 306.75 g of a 48.9% solution of acrylamide (150 g), 0.60 g of sodium formate and 0.25 g of EDTA. The mixture is heated to 35° C. and 0.30 g of a 2% solution of VA-044 is added. The resulting solution is sparged with 1000 cc/min. of nitrogen. After 60 minutes, polymerization begins and the solution becomes viscous. After 2 hours, the mixture is a milky dispersion to which is added 0.30 g of a 2% solution of 2,2'azobis(N,N'-dimethylene isobutryramidine) dihydrochloride. After 3.5, hours a third 0.30 g of a 2% solution of VA-044 is added. After 4.5 hours, 1.2 g of a 2% solution of VA-044 is added. After 7 hours 2.90 g of a 2% solution of VA-044 is added. The reaction is continued for a total of 24 hours at 34–36° C. The resulting polymer dispersion has a Brookfield viscosity of 555 cps, a pH of 6.0, and contains 15% of a homopolymer of acrylamide with an intrinsic viscosity of 13.6 dl/gm in 1.0 molar $NaNO_3$.

EXAMPLE 60

To a 1.5-liter resin reactor equipped with strirrer, temperature controller and water cooled condenser is added 426.57 g of deionized water, 120 g of sodium sulfate, 80 g of ammonium sulfate, 3.33 g of a 50% solution of sodium hydroxide, 60 g of a 10% solution (Example 20) of a 19/81 mole/mole Amps/acrylic acid copolymer (IV=8.02 dl/gm), 306.75 g of a 48.9% solution of acrylamide (150 g), 0.60 g of sodium formate and 0.25 g of EDTA. The mixture is heated to 35° C. and 0.30 g of a 2% solution of VA-044 is added. The resulting solution is sparged with 1000 cc/min. of nitrogen. After 60 minutes, polymerization begins and the solution becomes viscous. After 2 hours, the mixture is a milky dispersion to which is added 0.30 g of a 2% solution of 2,2'azobis(N,N'-dimethylene isobutryramidine) dihydrochloride. After 3 hours, 0.60 g of a 2% solution of VA-044 is added. After 4.5 hours, 1.2 g of a 2% solution of VA-044 is added. After 7 hours, 2.60 g of a 2% solution of VA-044 is added. The reaction is continued for a total of 24 hours at 34–36° C. The resulting polymer dispersion has a Brookfield viscosity of 1645 cps, a pH of 6.0, and contains 15% of a homopolymer of acrylamide with an intrinsic viscosity of 13.4 dl/gm in 1.0 molar $NaNO_3$.

EXAMPLE 61

To a 1.5-liter resin reactor equipped with strirrer, temperature controller and water cooled condenser is added 434.35 g of deionized water, 120 g of sodium sulfate, 80 g of ammonium sulfate, 5.25 g of a 50% solution of sodium hydroxide, 50 g of a 12% solution (Example 21) of an acrylic acid homopolymer (IV=1.87 dl/gm), 306.75 g of a 48.9% solution of acrylamide (150 g), 0.60 g of sodium formate and 0.25 g of EDTA. The mixture is heated to 35° C. and 0.30 g of a 2% solution of VA-044 is added. The resulting solution is sparged with 1000 cc/min. of nitrogen. After 60 minutes, polymerization begins and the solution becomes viscous. After 2 hours, the mixture is a milky dispersion to which is added 0.30 g of a 2% solution of 2,2'azobis(N,N'-dimethylene isobutryramidine) dihydrochloride. After 3.5 hours, 0.30 g of a 2% solution of VA-044 is added. After 4.5 hours 1.2 g of a 2% solution of VA-044 is added. After 7 hours 2.90 g of a 2% solution of VA-044 is added. The reaction is continued for a total of 24 hours at 34–36° C. The resulting polymer dispersion has a Brookfield viscosity of 130 cps, a pH of 6.0, and contains 15% of a homopolymer of acrylamide with an intrinsic viscosity of 13.8 dl/gm in 1.0 molar $NaNO_3$.

EXAMPLE 62

To a 1.5-liter resin reactor equipped with strirrer, temperature controller and water cooled condenser is added 403.75 g of deionized water, 131.25 g of sodium sulfate, 87.5 g of ammonium sulfate, 64 g of a 15% solution (Example 22) of an 80/20 mole/mole acrylic acid/AMPS copolymer (IV=1.94 dl/gm), 481.72 g of a 48.6% solution of acrylamide (234.1 g), 0.60 g of sodium formate and 0.33 g of EDTA. The mixture is heated to 35° C. and 0.30 g of a 2% solution of VA-044 is added. The resulting solution is sparged with 1000 cc/min. of nitrogen. After 60 minutes, polymerization begins and the solution becomes viscous. After 2.75 hours, the mixture is a milky dough to which is added 0.30 g of a 2% solution of 2,2'azobis(N,N'-dimethylene isobutryramidine) dihydrochloride. After 3.75 hours, 0.30 g of a 2% solution of VA-044 is added. After 4.75 hours, the mixture becomes a milky dispersion and 1.2 g of a 2% solution of VA-044 is added. After 6.5 hours, 2.90 g of a 2% solution of VA-044 is added. The reaction is continued for a total of 24 hours at 34–36° C. At the end of the reaction the dispersion has a Brookfield viscosity of 2770 cps. To this dispersion is added 15 g of sodium sulfate and 10 g of ammonium sulfate. The resulting dispersion has a Brookfield viscosity of 487.5 cps and contains 20% of a homopolymer of acrylamide with an intrinsic viscosity of 15.26 dl/gm in 1.0 molar $NaNO_3$.

The properties of nonionic dispersion polymers prepared in Examples 53–61 are summarized Table 5.

TABLE 5

Dispersions of Acrylamide Homolymers with MAA/AMPS Stabilizers

| Example | Dispersion Concentration | Stabilizer mol/mol | Stabilizer IV dL/g | Brookfield Viscosity cps | IV dL/g |
|---|---|---|---|---|---|
| 53 | 15 | AMPS/AA 80/20 | 5.17 | 287.5 | 12.9 |
| 54 | 15 | AMPS/AA 34/66 | 2.79 | 160 | 14.2 |
| 55 | 15 | AA/AMPS 80/20 | 2.02 | 140 | 13.5 |
| 56 | 15 | AMPS/AA 9.3/90.7 | 3.36 | 270 | 13.8 |
| 57 | 15 | AA | 3.72 | 562.5 | 15.5 |
| 58 | 15 | MAA | 2.45 | 820 | 13.4 |
| 59 | 15 | AA/AM 90/10 | 3.59 | 555 | 13.6 |
| 60 | 15 | AMPS/AA 19/81 | 8.02 | 1645 | 13.4 |
| 61 | 15 | AA | 1.87 | 130 | 13.8 |
| 62 | 20 | AA/AMPS 80/20 | 1.94 | 487.5 | 15.26 |

Changes can be made in the composition, operation and arrangement of the method of the present invention described herein without departing from the concept and scope of the invention as defined in the claims.

What is claimed is:

1. An aqueous dispersion of a particulate high molecular weight water soluble anionic or nonionic polymer, wherein the dispersion has a bulk Brookfield viscosity of from about 10 to about 25,000 cps at 25° C. and comprises from about 5 to about 50 weight percent of the water soluble polymer, wherein the water soluble polymer is prepared by polymerizing under free radical forming conditions in an aqueous solution of a water-soluble salt in the presence of a stabilizer at a pH greater than 5:

i. 0–7 mole percent of at least one anionic monomer, and, ii. 100–93 mole percent of at least one non-ionic monomer; and wherein the stabilizer is an anionic water soluble polymer containing from about 1.25 to about 20 mole percent 2-acrylamido-2-methyl-1-propanesulfonic acid, has an intrinsic viscosity in 1M $NaNO_3$ of from about 0.1–10 and comprises from about 0.1 to about 5 weight percent based on the total weight of the dispersion, and the water soluble salt is selected from the group consisting of ammonium, alkali metal and alkaline earth metal halides, sulfates, and phosphates and comprises from about 5 to about 40 weight percent based on the weight of the dispersion.

2. The aqueous dispersion of claim 1 wherein the anionic monomer is selected from the group consisting of acrylic acid, methacrylic acid, 2-acrylamido-2-methyl-1-propanesulfonic acid, acrylamidomethylbutanoic acid, malcic acid, fumaric acid, itaconic acid, vinyl sulfonic acid, styrene sulfonic acid, vinyl phosphonic acid, allyl sulfonic acid, allyl phosphonic acid, sulfomethylated acrylamide, phosphonomethylated acrylamide and the water soluble alkali metal, alkaline earth metal, and ammonium salts thereof and the nonionic monomer is selected from the group consisting of acrylamide, methacrylamide, N-isopropylacrylamide, N-t-butyl acrylamide, and N-methylolacrylamide.

3. The aqueous dispersion of claim 2 wherein the anionic monomer is acrylic acid or a water soluble alkali metal, alkaline earth metal, or ammonium salt thereof and the nonionic monomer is acrylamide.

4. The aqueous dispersion of claim 3 wherein the stabilizer is copolymer of acrylic acid or methacrylic acid and 2-acrylamido-2-methyl-1-propanesulfonic acid.

5. The aqueous dispersion of claim 4 wherein the stabilizer has a concentration of from about 0.25 to about 2 weight percent based on the total weight of the dispersion and an intrinsic viscosity in 1M $NaNO_3$ of from about 0.75 to about 7.0 dl/g.

6. The aqueous dispersion of claim 5 wherein the stabilizer is poly(2-acrylamido-2-methyl-1-propanesulfonic acid/acrylic acid) comprising from about 1.25 to about 19 mole percent 2-acrylamido-2-methyl-1-propanesulfonic acid and from about 98.75 to about 21 mole percent acrylic acid.

7. The aqueous dispersion of claim 5 wherein the stabilizer is poly(2-acrylamido-2-methyl-1-propanesulfonic acid/methacrylic acid) comprising from about 5 to about 20 mole percent 2-acrylamido-2-methyl-1-propanesulfonic acid and from about 95 to about 80 mole percent methacrylic acid.

8. The aqueous dispersion of claim 5 wherein the water-soluble polymer is poly(acrylic acid/acrylamide having a mole ratio of about 7:93 for acrylic acid to acrylamide.

9. The aqueous dispersion of claim 8 wherein the stabilizer is poly(2-acrylamido-2-methyl-1-propanesulfonic acid/acrylic acid) having a mole ratio of about 1.25:98.75 for 2-acrylamido-2-methyl-1-propanesulfonic acid to acrylic acid.

10. The aqueous dispersion of claim 8 wherein the stabilizer is poly(2-acrylamido-2-methyl-1-propanesulfonic acid/methacrylic acid) comprising from about 5 to about 20 mole percent 2-acrylamido-2-methyl-1-propanesulfoniic acid and from about 95 to about 80 mole percent methacrylic acid.

11. The aqueous dispersion of claim 5 wherein the water-soluble polymer is polyacrylamide.

12. A method of preparing an aqueous dispersion of a particulate high molecular weight anionic or nonionic polymer wherein the dispersion has a bulk Brookfield viscosity of from about 10 to about 25,000 cps at 25° C. comprising a) adding a free-radical initiator to an aqueous mixture comprising:

i. from about 5 to about 50 weight percent of a mixture comprising 0 to about 7 mole percent of at least one anionic monomer and 100 to about 93 mole percent of at least one non-ionic vinyl monomer;

ii. from about 0.1 to about 5 weight percent based on the total weight of the dispersion of a stabilizer, wherein the stabilizer is an anionic water soluble polymer containing from about 1.25 to about 20 mole percent 2-acrylamido-2-methyl-1-propanesulfonic acid and having an intrinsic viscosity in 1 M $NaNO_3$ of from about 0.1–10 and iii. from about 5 to about 40 weight percent based on the weight of the dispersion of a water soluble salt selected from the group consisting of ammonium, alkali metal and alkaline earth metal halides, sulfates, and phosphates; and b) polymerizing the monomers.

* * * * *